(12) United States Patent
Waiker et al.

(10) Patent No.: US 10,888,083 B2
(45) Date of Patent: Jan. 12, 2021

(54) ANIMAL TRAP

(71) Applicant: AGMAR TOOLS 2000 LIMITED, Lower Hutt (NZ)

(72) Inventors: Fredric Waiker, Lower Hutt (NZ); Henrik Karl Waiker, Lower Hutt (NZ)

(73) Assignee: AGMAR TOOLS 2000 LIMITED, Lower Hutt (NZ)

( * ) Notice: Subject to any disclaimer, the term of this patent is extended or adjusted under 35 U.S.C. 154(b) by 0 days.

(21) Appl. No.: 16/966,217

(22) PCT Filed: Feb. 7, 2019

(86) PCT No.: PCT/NZ2019/050011
§ 371 (c)(1),
(2) Date: Jul. 30, 2020

(87) PCT Pub. No.: WO2019/156575
PCT Pub. Date: Aug. 15, 2019

(65) Prior Publication Data
US 2020/0390082 A1  Dec. 17, 2020

(30) Foreign Application Priority Data

Feb. 9, 2018 (NZ) .................................... 739796
Apr. 27, 2018 (NZ) .................................... 741980
Oct. 29, 2018 (NZ) .................................... 747792

(51) Int. Cl.
*A01M 23/24* (2006.01)
*F16M 13/02* (2006.01)

(52) U.S. Cl.
CPC ........ *A01M 23/245* (2013.01); *F16M 13/027* (2013.01)

(58) Field of Classification Search
CPC ..... A01M 23/24; A01M 23/245; A01M 23/30
See application file for complete search history.

(56) References Cited

U.S. PATENT DOCUMENTS 1,870,712 A * 8/1932 Crown .................... A01M 1/20
43/119
4,212,128 A * 7/1980 Vance ................... A01M 23/30
43/81

(Continued)

FOREIGN PATENT DOCUMENTS

GB  179305 A  5/1922
GB  198743 A  6/1923

OTHER PUBLICATIONS

International Searching Authority, International Search Report and Written Opinion for International Application No. PCT/NZ2019/050011, dated May 16, 2019, (13 pages), Australian Patent Office.

(Continued)

*Primary Examiner* — Michael H Wang
(74) *Attorney, Agent, or Firm* — Alston & Bird LLP

(57) ABSTRACT

A ceiling-mountable animal trap (100) has a housing (102), a snap trap (110), and an indicator (118). The snap trap (110) has a treadle member (112), a killing arm arrangement, and a trigger (116). A killing arm (114) is pivotally mounted, has a set position, and is biased toward an impact position. The trigger (116) couples the treadle member (112) to the killing arm (114) and releases the killing arm from the set position. The indicator (118) is movable between a recessed position and a projecting position in which it projects from the underside of the housing (102). The indicator is held in the recessed position by the killing arm arrangement when the killing arm (114) is in the set position. The indicator (118) decouples from the killing arm arrangement when the killing arm (114) moves towards the impact position so that the indicator moves to the projecting position.

20 Claims, 30 Drawing Sheets

(56) References Cited

U.S. PATENT DOCUMENTS

| | | | |
|---|---|---|---|
| 5,267,411 A | 12/1993 | Phillips et al. | |
| 7,051,473 B2* | 5/2006 | Hoppe et al. | A01M 1/20 |
| | | | 43/131 |
| 7,394,389 B2* | 7/2008 | Nelson | G08B 23/00 |
| | | | 340/573.2 |
| 8,219,637 B2 | 7/2012 | Harrison | |
| 9,504,243 B1* | 11/2016 | Barto et al. | A01M 23/08 |
| 2011/0072709 A1* | 3/2011 | Patterson et al. | A01M 23/30 |
| | | | 43/81 |
| 2018/0146657 A1* | 5/2018 | Reilly | A01M 23/24 |
| 2019/0350186 A1* | 11/2019 | Drake et al. | A01M 1/24 |

OTHER PUBLICATIONS

International Preliminary Examining Authority, International Preliminary Report on Patentability for International Application No. PCT/NZ2019/050011, dated Oct. 23, 2019, (20 pages), Australian Patent Office.

*One Click Mouse Trap* (article, online), (2 pages), published Aug. 5, 2017, as per Wayback Machine. [Retrieved from the Internet on May 21, 2019] <https://web.archive.org/web/20170805162048/http://www.made2catch.com/made2catch-one-click-mouse-trap/>.

\* cited by examiner

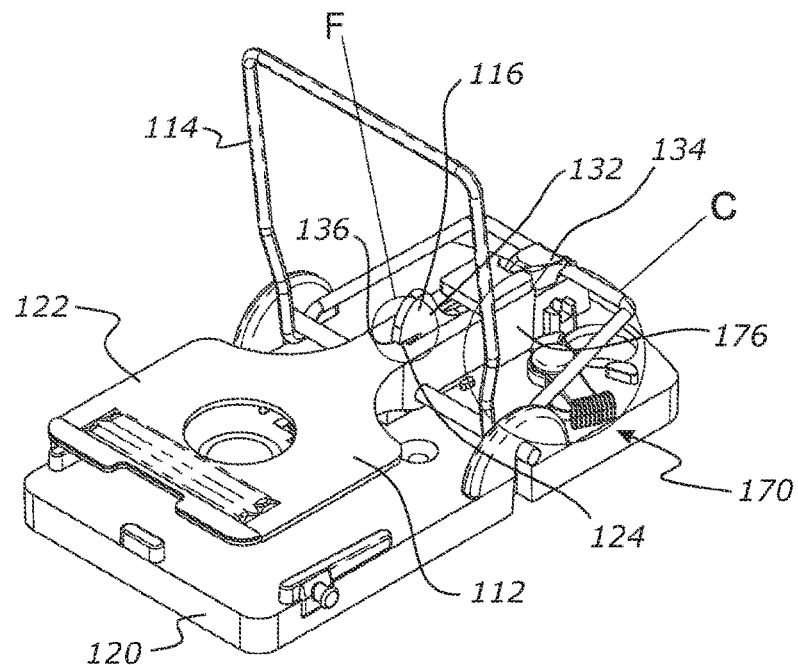
*FIGURE 14A*
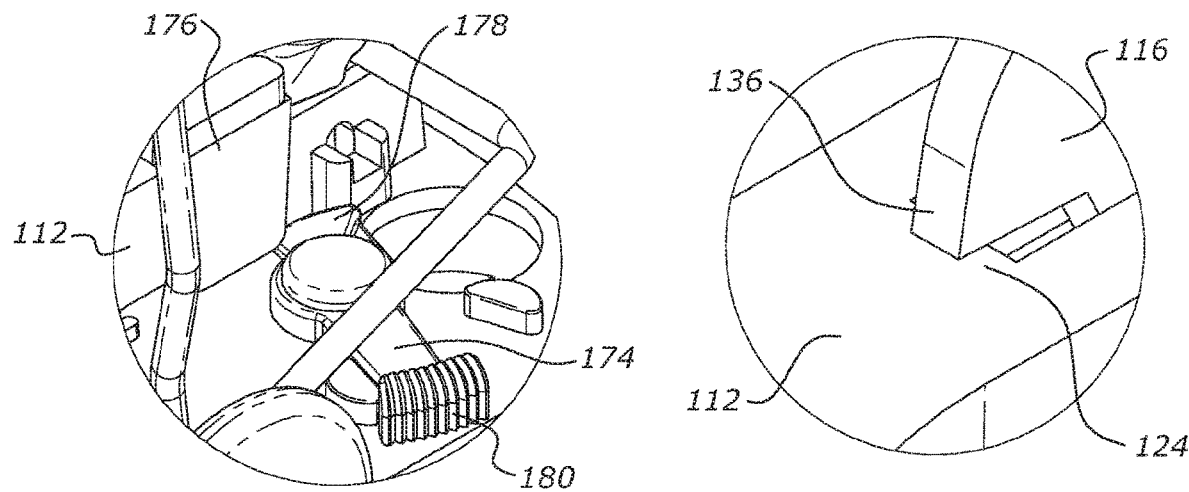
*FIGURE 14B*  *FIGURE 14C*

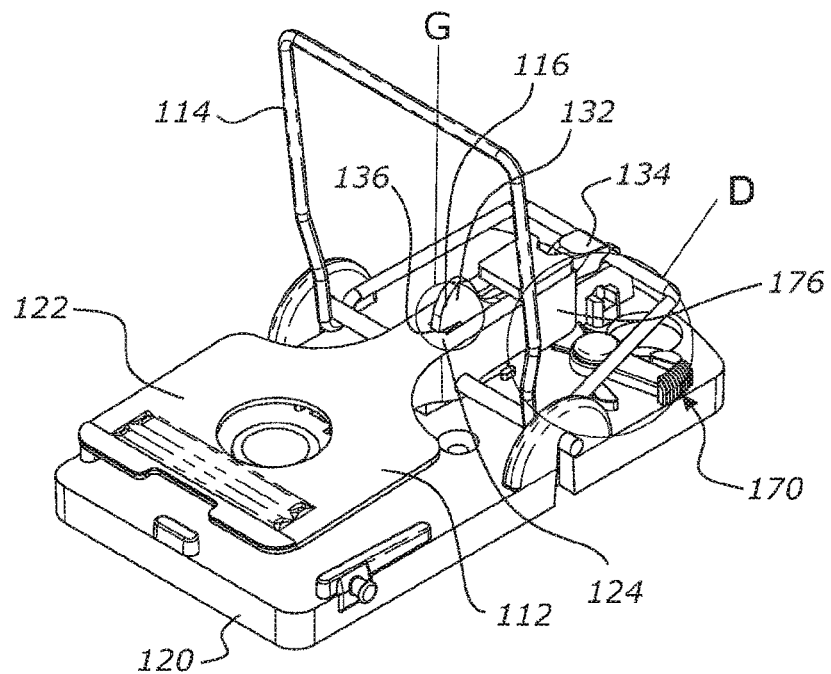
*FIGURE 15A*
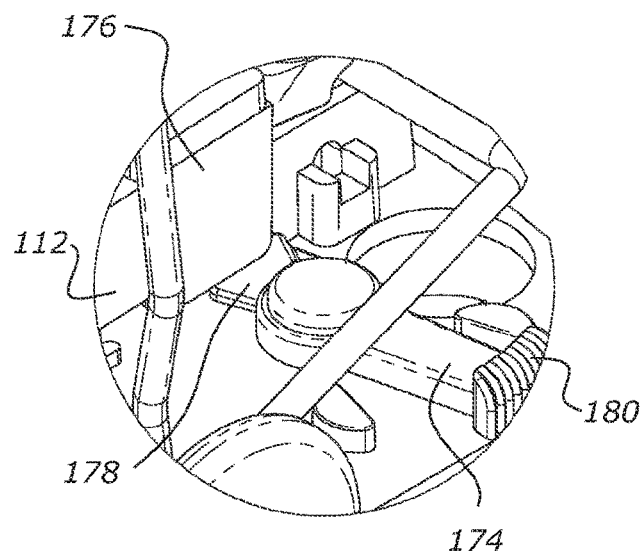 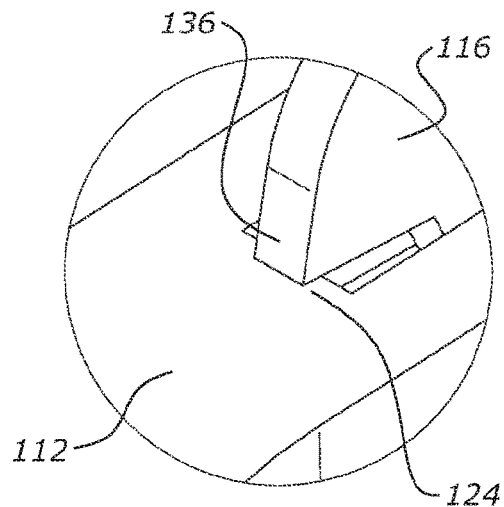
*FIGURE 15B* *FIGURE 15C*

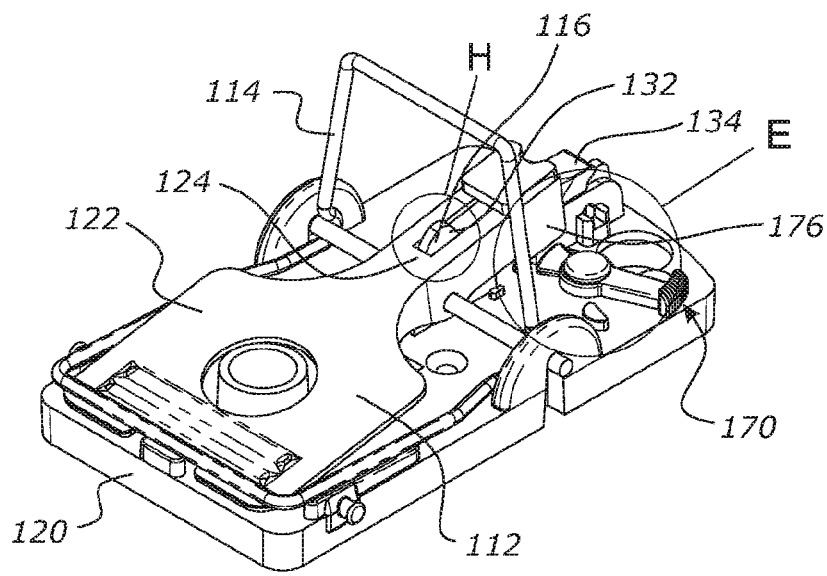
*FIGURE 16A*
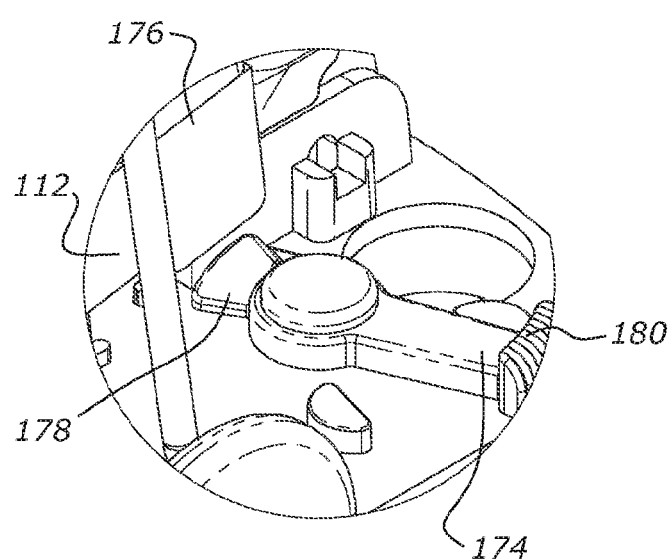 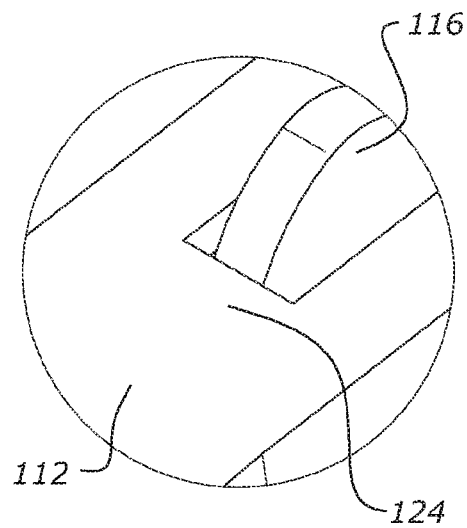
*FIGURE 16B*  *FIGURE 16C*

ANIMAL TRAP

CROSS REFERENCE TO RELATED APPLICATIONS

This application is a National Stage Application, filed under 35 U.S.C. § 371, of International Application No. PCT/NZ2019/050011, filed Feb. 7, 2019, which international application claims priority to New Zealand Application No. 747792, filed Oct. 29, 2018, New Zealand Application No. 741980, filed Apr. 27, 2018, and New Zealand Application No. 739796, filed Feb. 9, 2018; the contents of all of which as are hereby incorporated by reference in their entireties.

BACKGROUND

Related Field

This invention relates to an animal trap for trapping an animal. In some embodiments, the invention relates to an animal trap for trapping a rodent such as a mouse, rat, or other similar animal.

Description of Related Art

Rodents such as rats and mice are a serious problem in many countries. In the wild, the rodents can pose a threat to native species or other animals. Rodents often use commercial and residential buildings for shelter, and may live in ceiling cavities due to the shelter, darkness, and warmth that is provided in such environments. Rats in particular can cause significant damage to buildings, and potentially even fire risk, by chewing through items such as electrical cabling.

A common method of exterminating these animals in the wild or in buildings is by setting traps or poisoning with bait.

In buildings, the traps or bait can be placed in rooms, at ground level for example. However, there is a high risk of injury or poisoning, particularly of children or pets, if they are not kept away from the traps or bait. This makes in-room trapping or baiting unsuitable for many homes and commercial premises.

An alternative is to place traps or bait in a ceiling cavity. However, unless the ceiling cavity is routinely monitored, it is possible that a rodent will be killed in the trap or may take the bait elsewhere in the ceiling cavity and die, without the building occupier being aware. They may only become aware once signs of the rotting animal become apparent, such as a bad odour or the appearance of maggots. Another difficulty is that bait may be taken from a trap without the building occupier being aware, meaning the trap is no longer attracting rodents. Again, this would only be determined by routine monitoring.

Effective trapping requires fast clearing of killed animals to reduce learnt behaviour.

U.S. Pat. No. 9,504,243 discloses a rodent trap in which a rodent drops into a canister through a one-way hole onto an indicator button, thus pushing the indicator button out of the base of the trap indicating that a live animal is caught in the trap. The indicator button is held in place with a friction fit. If the friction fit is too low, the indicator button could be prone to false alerts. If the friction fit is too high, the indicator button may not be pushed out of the base of the trap by the animal. It may also be possible for the animal to enter the trap without actually landing on the indicator button. In most embodiments the canister hangs below the ceiling, meaning that a large, unsightly, cylindrical canister hangs from the ceiling at all times. FIG. 6 of that specification shows an embodiment that is recessed into a ceiling panel. In that configuration, the canister projects up a long distance from the ceiling panel, meaning the animal needs to climb up onto the canister to enter the one-way hole. That reduces the likelihood of the animal choosing to enter the trap.

U.S. Pat. No. 7,051,473 describes a bait device that can be installed into a panel. A mechanical trap may be used. The device may have a window to observe the interior state of the device. Although such a window may enable a user to see the interior of the device, it requires a user to go and actively look into the device through the window to see if there is bait remaining.

U.S. Pat. No. 8,219,637 discloses a floor use snap trap station in which activation of the trap inside the station causes the swinging arm of the trap to impact against, and activate the indicator. The indicator may be a spring-loaded pop-up indicator or a swinging flag indicator. In the pop-up indicator embodiment, the trap relies on angling of the indicator to prevent it extending from the cover. When the trap arm triggers, it contacts the case of the indicator to release it, so it can pop up under the force of the spring. Such a configuration could be susceptible to accidental triggering due to external forces such as vibration. Additionally, because the trap arm travels past and impacts on the indicator with great force when the trap is triggered, the indicator could easily be damaged in use and may only be usable for a short time before it needs to be repaired or replaced.

U.S. Pat. No. 5,267,411 discloses a floor use trap station in which activation of the trap draws an indicator into the housing to indicate that activation has occurred. Because the indicator is coupled to the trap and projects from the housing when the trap is set, the trap could be inadvertently triggered by a person or animal contacting the indicator. Having an indicator that projects from the housing in the usual set state of the trap is unsightly.

It would be desirable to provide an improved animal trap for ceiling use that provides a reliable indication to the building occupier that the trap has been triggered, so they know that they should check the trap to remove the dead animal and reset the trap if necessary.

Many traps are only suitable for exterminating a single type of animal. For example, a mouse snap trap is generally smaller than a rat snap trap, with lower impact force being provided by the mouse snap trap. That lower impact force is unlikely to be sufficient to kill a rat, but a rat will learn from encountering and triggering the mouse snap trap, meaning they are unlikely to take bait from a rat snap trap.

The force required to trigger a rat snap trap is generally much higher than the force required to trigger a mouse snap trap, meaning that a mouse will generally not be able to trigger the rat snap trap but will be able to eat the food bait in the trap. Although people may be aware that they have a rodent problem, they will often not know whether their problem is with smaller rodents such as mice or larger rodents such as rats. Therefore, they need to rely on trial and error, and potentially buying two different types of traps, to combat their rodent problem.

Although it could, in theory, be possible to have a snap trap that provides the killing force of a rat trap but the triggering force of a mouse trap, such a trap could be susceptible to false triggering, particularly if it is used in an environment with a lot of vibration such as an industrial workshop or outdoor in windy environments.

U.S. Pat. No. 4,212,128 discloses a snap trap in which an animal stepping on to an angled platform moves a trigger member to release a striker wire. Movement of a bait receptacle along wires changes the angle of the platform, therefore altering the pressure required on the platform to trigger the trap. The bait receptacle is in the impact zone that the striker wire passes through. Therefore, it is likely to be risky to adjust the sensitivity of the trap when the trap is set, as the trap may impact on a user's hand causing injury. The trap does not provide a controlled way for a user to trigger the trap if they no longer want the trap set. Rather, the user will need to hold and control movement of the striker wire after releasing the trigger which, again, could result in injury.

GB 198,743 describes a snap trap in which pressure on a platform moves a cranked spring part down to release the jaw. The sensitivity of the spring can be adjusted by sliding an external ring downwards to alter the line of direction of the action of the spring. This adjustment relies on a complex arrangement of springs and members and adjusting their relative positions, and may be inaccurate. The trap does not provide a controlled way for a user to trigger the trap if they no longer want it set. Rather, the user will need to hold and control movement of the jaw after releasing the trigger which could result in injury.

GB 179,305 describes a box with snap traps at each end. Each trap platform is connected via a spring to a nut and bolt. The sensitivity of the snap traps can be altered by increasing the tension on the spring via the nut. Again, this adjustment may be inaccurate and the trap does not provide a controlled way for a user to trigger the trap.

Accordingly, it would be desirable to provide an animal trap that provides reliable adjustment of the sensitivity of a trap, to enable the trap to be used for different sized animals, and that optionally provides for a controlled way for the user to trigger the trap with little risk of injury to the user.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a trap that overcomes at least some of the disadvantages of known traps, and/or to at least provide the public with a useful alternative.

BRIEF SUMMARY

In accordance with a first aspect of the present disclosure, there is provided a ceiling-mountable animal trap comprising:
  a housing that is arranged to be mounted to an underside of a ceiling, the housing having an underside and an upper side;
  a snap trap in the upper side of the housing, the snap trap comprising:
    a treadle member;
    a killing arm arrangement comprising a killing arm and a pivot member configured such that the killing arm is pivotally mounted relative to the housing and is movable from a set position to an impact position, wherein the killing arm is biased toward the impact position; and
    a trigger that couples the treadle member to the killing arm and that is arranged to release the killing arm from the set position upon the treadle member being moved by an animal in the trap;
  and an indicator that is movable between a recessed position in which it is at least substantially recessed in the housing and a projecting position in which it projects from the underside of the housing, wherein the indicator is configured to be held in the recessed position by the killing arm arrangement when the killing arm is in the set position, and wherein the indicator is configured to decouple from the killing arm arrangement when the killing arm moves from the set position towards the impact position so that the indicator moves to the projecting position.

In an embodiment, the indicator is configured to be held in the recessed position by the killing arm when the killing arm is in the set position, and the indicator is configured to decouple from the killing arm when the killing arm moves from the set position towards the impact position so that the indicator moves to the projecting position. In such an embodiment, the animal trap may have any one or more features outlined below in relation to the second aspect of the present disclosure.

In an alternative embodiment, the indicator is configured to be held in the recessed position by the pivot member when the killing arm is in the set position, and the indicator is configured to decouple from the pivot member when the killing arm moves from the set position towards the impact position so that the indicator moves to the projecting position. In such an embodiment, the animal trap may have any one or more features outlined below in relation to the third aspect of the present disclosure.

The animal trap of the first aspect may have any one or more of the features outlined in relation to the fifth aspect below. For example, the animal trap of the first aspect may have the sensitivity adjuster of the fifth aspect.

In accordance with a second aspect of the present disclosure, there is provided a ceiling-mountable animal trap comprising:
  a housing that is arranged to be mounted to an underside of a ceiling, the housing having an underside and an upper side;
  a snap trap in the upper side of the housing, the snap trap comprising:
    a treadle member;
    a killing arm that is pivotally mounted relative to the housing and that is movable from a set position to an impact position, wherein the killing arm is biased toward the impact position; and
    a trigger that couples the treadle member to the killing arm and that is arranged to release the killing arm from the set position upon the treadle member being moved by an animal in the trap;
  and an indicator that is movable between a recessed position in which it is at least substantially recessed in the housing and a projecting position in which it projects from the underside of the housing, wherein the indicator is configured to be held in the recessed position by the killing arm when the killing arm is in the set position, and wherein the indicator is configured to decouple from the killing arm when the killing arm moves from the set position towards the impact position so that the indicator moves to the projecting position.

In an embodiment, the indicator is configured to move to the projecting position solely under the influence of gravity, following decoupling from the killing arm.

In an alternative embodiment, the indicator is biased toward the projecting position by a biasing member such as a spring.

In an embodiment, one of the killing arm and the indicator comprises a magnet, and the other of the killing arm and the indicator comprises a magnet or a magnetisable material, the killing arm and indicator configured such that the indicator is held in the recessed position by the killing arm under magnetic force when the killing arm is in the set position.

In an alternative embodiment, the indicator is releasably coupled to the killing arm by a biased latch, wherein the extent of biasing of the killing arm towards the impact position is greater than the extent of biasing of the biased latch, such that the indicator is held in the recessed position by the killing arm, via the biased latch, when the killing arm is in the set position, and the biased latch releases so that the indicator is decoupled from the killing arm when the killing arm moves from the set position towards the impact position.

In an embodiment, the indicator is fully recessed in the housing when the indicator is in the recessed position. In an embodiment, an underside of the indicator is substantially flush with the underside of the housing when the indicator is in the recessed position.

In an embodiment, a portion of the periphery of the indicator comprises a different colour and/or pattern compared to an underside of the indicator and the underside of the housing, wherein the portion of the periphery of the indicator is exposed from the housing when the indicator is in the projecting position but not when the indicator is in the recessed position.

In an embodiment, the underside of the housing is arranged to be substantially flush with an underside of the ceiling, when the housing is mounted to the underside of the ceiling.

In an embodiment, the treadle member is arranged to be substantially flush with an upper side of the ceiling, when the housing is mounted to the underside of the ceiling.

In an embodiment, the snap trap further comprises a setting lever that is operatively connected to the killing arm, to enable a user to set the snap trap.

In an embodiment, the animal trap comprises a cover, the cover defining an opening that provides an animal access-way adjacent the free end of the treadle member.

In an embodiment, the cover is pivotally mounted relative to the housing and is movable between a covering position in which it substantially covers the snap trap and a retracted position in which the snap trap is substantially exposed.

In an embodiment, the setting lever is positioned externally of the cover.

In an embodiment, the animal trap is a rodent trap. For example, the animal trap may be used for trapping mice or rats. Additionally, or alternatively, the animal trap may be used for trapping mustelids such as ferrets, stoats, or weasels.

In an embodiment, the animal trap comprises a mounting plate for mounting to the ceiling, and the housing is releasably engageable with the mounting plate. In an embodiment, the housing is engageable with, and releasable from, the mounting plate by turning the housing relative to the mounting plate.

In an embodiment the animal trap is provided in combination with a handle that is usable by a user to turn the housing relative to the mounting plate. In an embodiment, the handle and the underside of the housing comprise complementary engagement features that enable the handle to releasably engage with the underside of the housing.

In an embodiment, the mounting plate is an annular plate and the housing comprises a circular shape. However, the mounting plate and housing can have any suitable shape, such as elliptical, square, rectangular, or any other suitable shape.

In an embodiment, the killing arm pivots substantially 90° from the set position to the impact position. In an alternative embodiment, the killing arm pivots substantially 180° from the set position to the impact position.

The trap may have any one or more of the features outlined in relation to the fifth aspect below. For example, the trap of the second aspect may have the sensitivity adjuster of the fifth aspect.

In accordance with a third aspect of the present disclosure, there is provided a ceiling-mountable animal trap comprising:
  a housing that is arranged to be mounted to an underside of a ceiling, the housing having an underside and an upper side;
  a snap trap in the upper side of the housing, the snap trap comprising:
    a treadle member;
    a killing arm arrangement comprising a killing arm and a pivot member configured such that the killing arm is pivotally mounted relative to the housing and is movable from a set position to an impact position, wherein the killing arm is biased toward the impact position; and
    a trigger that couples the treadle member to the killing arm and that is arranged to release the killing arm from the set position upon the treadle member being moved by an animal in the trap;
  and an indicator that is movable between a recessed position in which it is at least substantially recessed in the housing and a projecting position in which it projects from the underside of the housing, wherein the indicator is configured to be held in the recessed position by the pivot member when the killing arm is in the set position, and wherein the indicator is configured to decouple from the pivot member when the killing arm moves from the set position towards the impact position so that the indicator moves to the projecting position.

In an embodiment, the pivot member is configured to be in a first position when the killing arm is in the set position, and is configured to move from the first position to a second position when the killing arm moves from the set position towards the impact position. In an embodiment, the pivot member is configured to move on an arcuate path from the first position to the second position. Alternatively, the pivot member is configured to move on a substantially linear path from the first position to the second position.

In an embodiment, the pivot member is operatively connected to the killing arm to move from the first position to the second position when the killing arm moves from the set position toward the impact position.

In an embodiment, the extent of movement of the pivot member is less than the extent of movement of the killing arm. In an embodiment, the pivot member is operatively connected to the killing arm by a biasing member that biases the killing arm toward the killing position.

In an alternative embodiment, the extent of movement of the pivot member is substantially the same as the extent of movement of the killing arm. In an embodiment, the pivot member is connected to or integrally formed with the killing arm to move with the killing arm.

In an embodiment, the pivot member comprises a shaft.

In an embodiment, the pivot member comprises a first portion adjacent a first surface of the snap trap corresponding to the location of the killing arm and a second portion extending at an angle relative to the first portion and adjacent a second surface of the snap trap. In an embodiment, the second portion is configured to hold the indicator in the recessed position when the killing arm is in the set position. In an embodiment, the pivot member is substantially L-shaped. In an alternative embodiment, the pivot member comprises a third portion extending at an angle relative to the second portion and adjacent to a third surface of the snap trap. In an embodiment, the third portion is configured to hold the indicator in the recessed position when the killing arm is in the set position. In an embodiment, the third surface of the snap trap is opposite to the first surface of the snap trap, and the pivot member is substantially U-shaped.

In an embodiment, the snap trap is arranged to be substantially horizontal when the housing is mounted to the ceiling. In an alternative embodiment, the snap trap is arranged to be upright when the housing is mounted to the ceiling. In an embodiment, the housing comprises an upright member to support the snap trap in the upright configuration. The upright member may be integrally formed with the remainder of the housing or may be connected to the remainder of the housing.

In an embodiment, the indicator is configured to move to the projecting position solely under the influence of gravity, following decoupling from the pivot member.

In an alternative embodiment, the indicator is biased toward the projecting position by a biasing member such as a spring.

In an embodiment, one of the pivot member and the indicator comprises a magnet, and the other of the pivot member and the indicator comprises a magnet or a magnetisable material, the pivot member and indicator configured such that the indicator is held in the recessed position by the pivot member under magnetic force when the killing arm is in the set position.

In an alternative embodiment, the indicator is releasably coupled to the pivot member by a biased latch, such that the indicator is held in the recessed position by the pivot member, via the biased latch, when the killing arm is in the set position, and the biased latch releases so that the indicator is decoupled from the pivot member when the killing arm moves from the set position towards the impact position.

In an alternative embodiment, the indicator is releasably coupled to the pivot member by a frictional engagement which is overcome when the killing arm moves from the set position towards the impact position.

In an embodiment, the indicator is fully recessed in the housing when the indicator is in the recessed position. In an embodiment, an underside of the indicator is substantially flush with the underside of the housing when the indicator is in the recessed position.

In an embodiment, a portion of the periphery of the indicator comprises a different colour and/or pattern compared to an underside of the indicator and the underside of the housing, wherein the portion of the periphery of the indicator is exposed from the housing when the indicator is in the projecting position but not when the indicator is in the recessed position.

In an embodiment, the underside of the housing is arranged to be substantially flush with an underside of the ceiling, when the housing is mounted to the underside of the ceiling.

In an embodiment in which the snap trap is arranged to be substantially horizontal when the housing is mounted to the ceiling, the treadle member is arranged to be substantially flush with an upper side of the ceiling, when the housing is mounted to the underside of the ceiling.

In an embodiment, the snap trap further comprises a setting lever that is operatively connected to the killing arm, to enable a user to set the snap trap.

In an embodiment, the animal trap comprises a cover, the cover defining an opening that provides an animal accessway adjacent the free end of the treadle member.

In an embodiment, the cover is pivotally mounted relative to the housing and is movable between a covering position in which it substantially covers the snap trap and a retracted position in which the snap trap is substantially exposed.

In an embodiment, the setting lever is positioned externally of the cover.

In an embodiment, the animal trap is a rodent trap. For example, the animal trap may be used for trapping mice or rats. Additionally, or alternatively, the animal trap may be used for trapping mustelids such as ferrets, stoats, or weasels.

In an embodiment, the animal trap comprises a mounting plate for mounting to the ceiling, and the housing is releasably engageable with the mounting plate. In an embodiment, the housing is engageable with, and releasable from, the mounting plate by turning the housing relative to the mounting plate.

In an embodiment the animal trap is provided in combination with a handle that is usable by a user to turn the housing relative to the mounting plate. In an embodiment, the handle and the underside of the housing comprise complementary engagement features that enable the handle to releasably engage with the underside of the housing.

In an embodiment, the mounting plate is an annular plate and the housing comprises a circular shape. However, the mounting plate and housing can have any suitable shape, such as elliptical, square, rectangular, or any other suitable shape.

In an embodiment, the killing arm pivots substantially 90° from the set position to the impact position. In an embodiment, the pivot member pivots up to about 10° from the first position to the second position. In an embodiment, the pivot member pivots about 7° from the first position to the second position. In an alternative embodiment, the killing arm pivots substantially 180° from the set position to the impact position.

The animal trap of the third aspect may have any one or more of the features outlined in relation to the fifth aspect below. For example, the animal trap of the third aspect may have the sensitivity adjuster of the fifth aspect.

In accordance with a fourth aspect of the present disclosure, there is provided a method of using an animal trap, comprising:
providing an animal trap as outlined in relation to the first, second, or third aspect above;
setting the snap trap so that the killing arm is in the set position and the indicator is in the recessed position;
mounting the animal trap to the underside of a ceiling; and
checking the animal trap if the indicator is in the projecting position.

In an embodiment, the step of mounting the animal trap to the underside of a ceiling comprises mounting the animal trap to the underside of a false ceiling or to the underside of a permanent ceiling.

In an embodiment, the step of checking the animal trap comprises removing the animal trap from the ceiling.

In an embodiment, the step of checking the animal trap is followed by resetting the snap trap and mounting the animal trap to the underside of the ceiling.

In an embodiment, the animal trap comprises a mounting plate that is mounted to the ceiling, and the step of mounting the trap to the underside of the ceiling comprises engaging the housing to the mounting plate by turning the housing relative to the mounting plate. In an embodiment, the step of checking the animal trap comprises disengaging the housing from the mounting plate by turning the housing relative to the mounting plate.

In an embodiment, the method comprises using a handle to turn the housing relative to the mounting plate.

In an embodiment, the underside of the housing is substantially flush with an underside of the ceiling, when the housing is mounted to the underside of the ceiling.

In an embodiment, the treadle member is substantially flush with an upper side of the ceiling, when the housing is mounted to the underside of the ceiling.

The animal trap used in the method of the fourth aspect may have any one or more of the features outlined in relation to the first, second, or third aspect above or the fifth aspect below.

In accordance with a fifth aspect of the present disclosure, there is provided a snap trap comprising:
  a base;
  a treadle member that is supported from the base;
  a killing arm that is pivotally mounted relative to the base and that is movable through an impact zone from a set position to an impact position, wherein the killing arm is biased toward the impact position;
  a trigger that couples the treadle member to the killing arm and that is arranged to release the killing arm from the set position upon the treadle member being moved by an animal in the snap trap;
  and a sensitivity adjuster to adjust the sensitivity of the snap trap, the sensitivity adjuster comprising an adjuster member that is adjustable by a user externally of the impact zone to adjust an angle of the treadle member relative to the base to thereby adjust the force that is required to move the treadle member to release the killing arm from the set position.

In an embodiment, the sensitivity adjuster has a first, high force, adjustment position in which a relatively large force is required to move the treadle member and a second, low force, adjustment position in which a relatively low force is required to move the treadle member.

In an embodiment, the treadle member has a free end for contact by an animal, and in the first, high force, adjustment position of the sensitivity adjuster a spacing between the free end and the base is relatively large, and in the second, low force, adjustment position of the sensitivity adjuster a spacing between the free end and the base is relatively small.

In an embodiment, the trigger comprises a trigger member that is pivotally mounted relative to the base, wherein the trigger member has an engagement portion that is configured to engage with, and hold, the killing arm when the killing arm is in the set position, and wherein the trigger member has a catch portion that is configured to engage with a catch surface of the treadle member, wherein the catch portion is configured to release from engagement with the catch surface of the treadle member upon movement of the treadle member by an animal, to enable the trigger member to pivot and release the killing arm to move under bias through the impact zone to the impact position.

In an embodiment, the catch portion of the trigger member is configured to overlap with the catch surface of the treadle member when the trap is set, and wherein the extent of overlap of the catch portion of the trigger member and the catch surface of the treadle member is configured to vary depending on the adjusted sensitivity position of the sensitivity adjuster.

In an embodiment, there is a relatively large overlap of the catch portion of the trigger member and the catch surface of the treadle member in the first, high force, adjustment position of the sensitivity adjuster and a relatively small overlap of the catch portion of the trigger member and the catch surface of the treadle member in the second, low force, adjustment position of the sensitivity adjuster.

In an embodiment, the sensitivity adjuster has a third, triggered, adjustment position in which the treadle member is moved by the sensitivity adjuster to a position that triggers the trap.

In an embodiment, there is no overlap of the catch portion of the trigger member and the catch surface of the treadle member in the third, triggered, adjustment position of the sensitivity adjuster.

In an embodiment, the adjuster member is configured to engage with a portion of the treadle member that is opposite to the free end of the treadle member. In an embodiment, the adjuster member is configured to remain in engagement with the portion of the treadle member in both the first, high force, adjustment position, and the second, low force, adjustment position. Alternatively, the adjuster member may be disengaged from the portion of the treadle member in the first, high force, adjustment position of the sensitivity adjuster, but may be engaged with the portion of the treadle member in the second, low force, adjustment position the sensitivity adjuster.

In an embodiment, the adjuster member comprises a cam portion at an end of the adjuster member, the cam portion configured to engage with the treadle member and adjust the angle of the treadle member upon movement of the adjustment member by a user.

In an embodiment, the treadle member is pivotally mounted about a pivot axis relative to the base, and the adjuster member is pivotally mounted relative to the base about a pivot axis that is transverse to the pivot axis of the treadle member.

In an alternative embodiment, the treadle member is pivotally mounted about a pivot axis relative to the base, and the adjuster member is rotatable relative to the base about a rotation axis that is parallel to the pivot axis of the treadle member.

In an alternative embodiment, the adjuster member is linearly slideable relative to the base.

In an embodiment, the adjuster member comprises a gripping portion for gripping by a user to move the adjuster member, wherein the gripping portion is external of the impact zone.

In an embodiment, the snap trap further comprises a setting lever that is operatively connected to the killing arm, to enable a user to set the snap trap.

In an embodiment, the snap trap comprises a cover that is supported from the base, the cover defining an opening that provides an animal accessway adjacent the free end of the treadle member.

In an embodiment, the cover is pivotally mounted to the base and is movable between a covering position in which it substantially covers the snap trap and a retracted position in which the snap trap is substantially exposed.

In an embodiment, the setting lever is positioned externally of the cover.

In an embodiment, the snap trap is configured for mounting to an upright surface. Alternatively, the snap trap may be configured for mounting to a surface on any suitable orientation, such as horizontally, vertically, or on an intermediate angle for example. In an embodiment, the snap trap is provided in combination with a mounting bracket for mounting to the surface, and the snap trap and the mounting bracket comprise complementary engagement portions for engaging the snap trap to the mounting bracket. For example, the snap trap may be configured for mounting to a tree, post, wall, floor, ground, ceiling, or any other suitable surface.

In an embodiment, the snap trap is a rodent trap. For example, the snap trap may be used for trapping mice or rats. In an embodiment, in a first, high force, adjustment position the snap trap could be triggered by a rat but not a mouse, and in second, low force, adjustment position the snap trap could be trigged by either a rat or a mouse. In an embodiment, the snap trap could, in the first, high force adjustment position, be triggered by a mustelid such as a ferret, stoat, or weasel.

The snap trap may have any one or more of the features outlined in relation to the first, second, or third aspect above. For example, the snap trap of the fifth aspect may be used in the ceiling mountable animal trap of the first, second, or third aspect.

In an embodiment of any of the aspects herein, the treadle member comprises an aperture to provide access to bait, and the treadle member comprises an inhibiting feature to inhibit an animal grabbing onto a periphery of the aperture. In an embodiment, the inhibiting feature comprises a projecting rim. In an embodiment, the projecting rim comprises an angled surface that is non-parallel and non-perpendicular relative to a contact pate of the treadle member. In an embodiment, the angled surface is at an angle of between about 30 degrees and about 60 degrees relative to the contact plate. In an embodiment, the angled surface is at an angle of about 45 degrees relative to the contact plate.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE FIGURES

The present invention will now be described by way of example only and with reference to the accompanying drawings in which:

FIG. 14A is an overhead perspective view of the trap of FIG. 13A with the sensitivity adjuster in a first, high force, adjustment position;

FIG. 14B is a view of detail C of FIG. 14A;

FIG. 14C is a view of detail F of FIG. 14A, showing a large overlap between the catch portion of the trigger member and the catch surface of the treadle member;

FIG. 15A is an overhead perspective view of the trap of FIG. 13A with the sensitivity adjuster in a second, low force, adjustment position;

FIG. 15B is a view of detail D of FIG. 15A;

FIG. 15C is a view of detail G of FIG. 15A, showing a small overlap between the catch portion of the trigger member and the catch surface of the treadle member;

FIG. 16A is an overhead perspective view of the trap of FIG. 13A with the sensitivity adjuster in a third, triggered, adjustment position;

FIG. 16B is a view of detail E of FIG. 16A;

FIG. 16C is a view of detail H of FIG. 16A, showing no overlap between the catch portion of the trigger member and the catch surface of the treadle member;

DETAILED DESCRIPTION OF VARIOUS EMBODIMENTS

Figure 1:
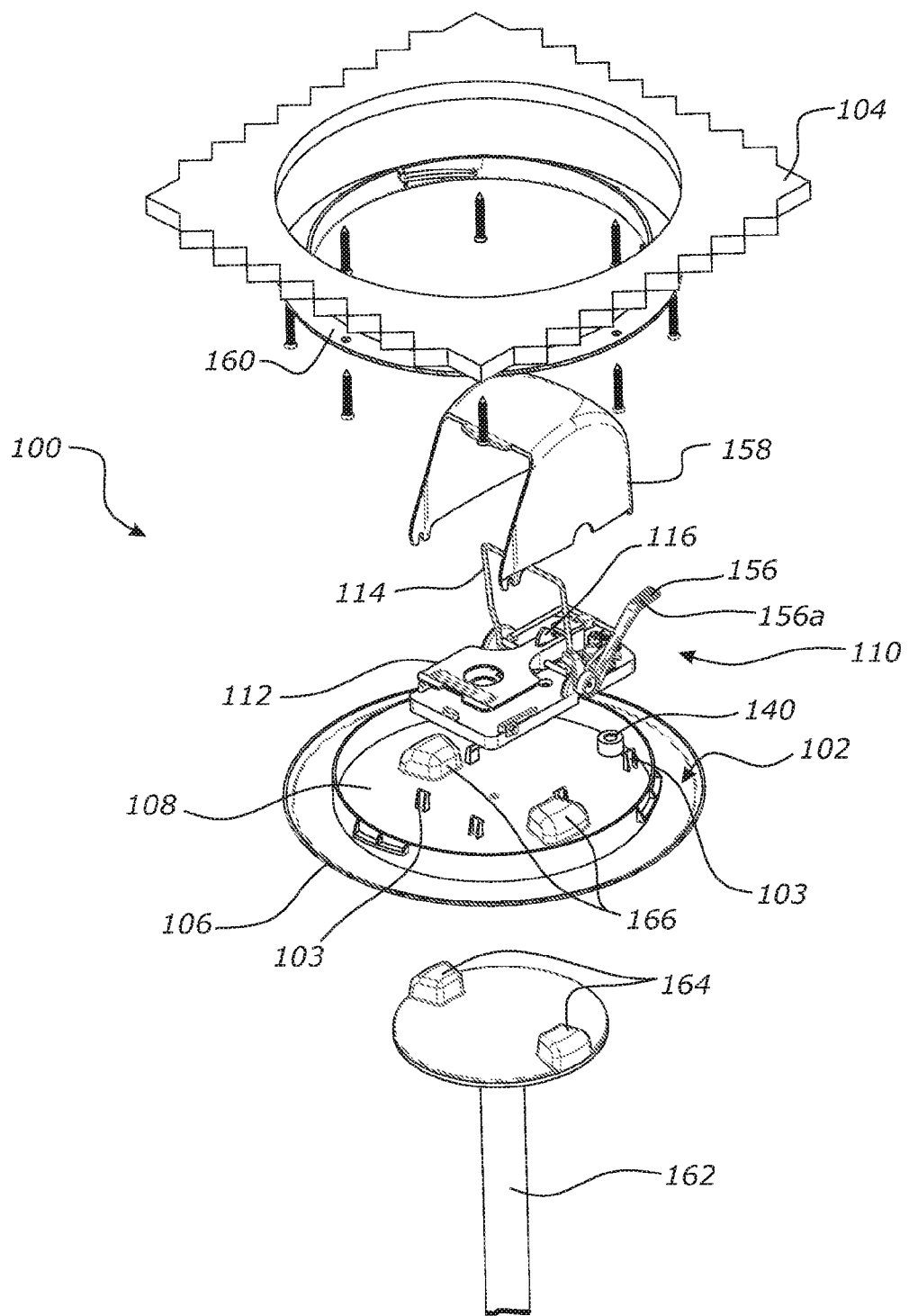
FIG. 1 is an exploded overhead perspective view of a first embodiment animal trap for mounting to the underside of a ceiling panel, and a handle for use by a user to mount the trap.

With reference to FIG. 1, a ceiling-mountable animal trap 100 has a housing 102 that is arranged to be mounted to an underside of a ceiling 104. The housing 102 has an underside 106 and an upper side 108. A snap trap 110 is arranged in the upper side 108 of the housing 102 and is either permanently mounted to the housing or releasably mounted or coupled to the housing, e.g. by clips 103. The base 120 of the snap trap could be integrally formed with the housing 102.

The snap trap 110 has a treadle member 112 in the form of a plate, a killing arm arrangement comprising a pivot member 113 and a killing arm 114, and a trigger 116.

Figure 9:
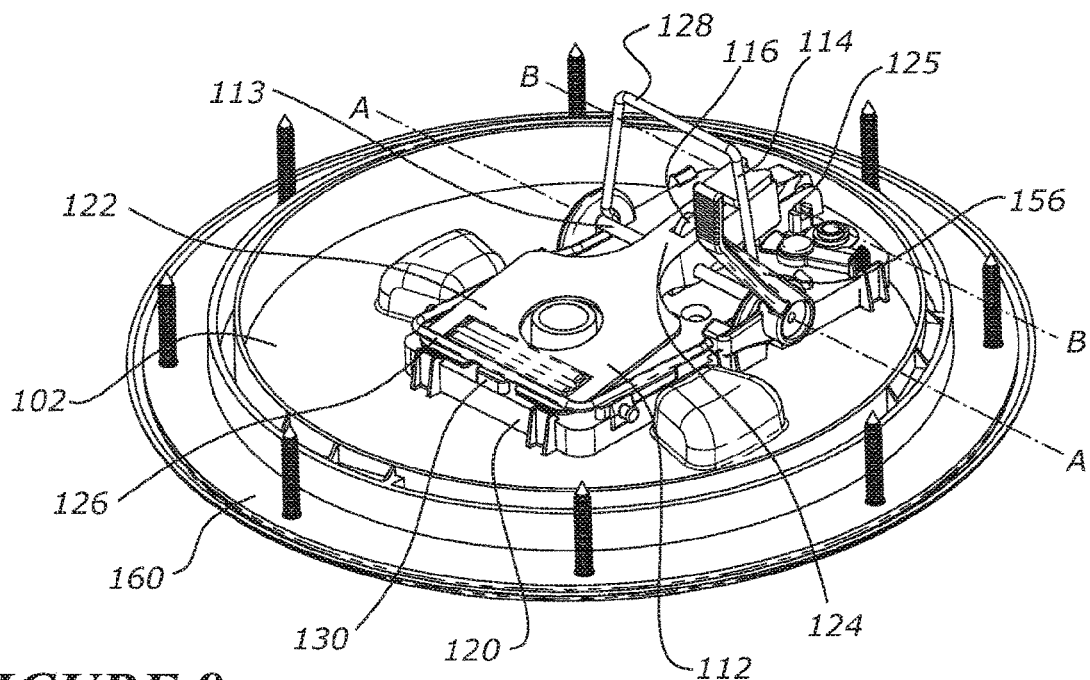
FIG. 9 is an overhead perspective view similar to FIG. 5, but with the trap triggered and the indicator in the projecting position.
Figure 10:
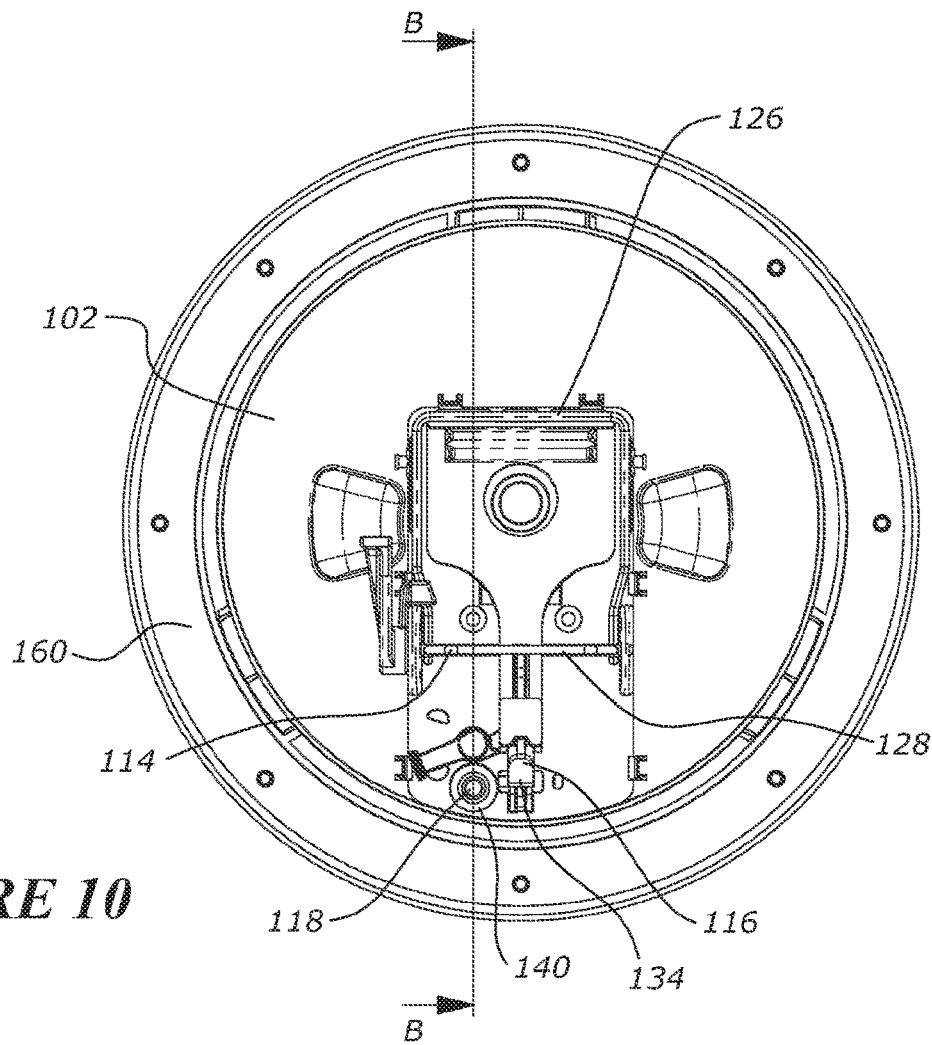
FIG. 10 is a plan view corresponding to FIG. 9.
Figure 11:
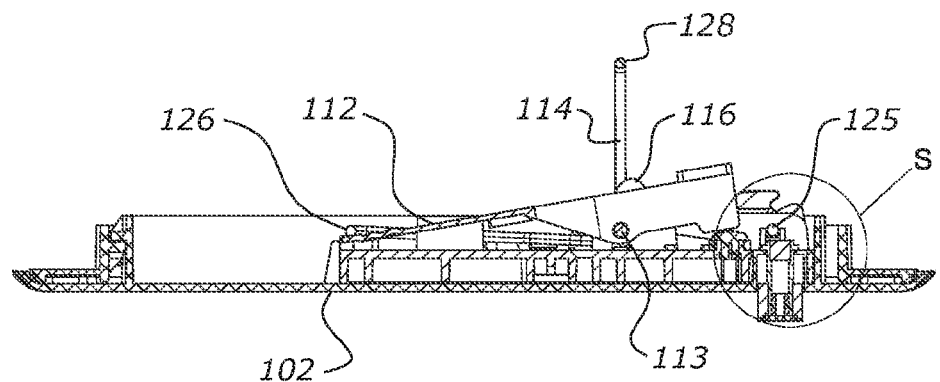
FIG. 11 is a section view along line B-B of FIG. 10, showing the trap triggered and the indicator in the projecting position.

The killing arm 114 is pivotally mounted relative to the housing 102 via the pivot member 113 and is movable from a set position (FIG. 1) to an impact position (FIG. 9). The killing arm 114 is biased toward the impact position in a known manner, for example by a torsion spring (not illustrated).

The trigger 116 couples the treadle member 112 to the killing arm 114. The trigger 116 is arranged to release the killing arm 114 from the set position upon the treadle member 112 being moved by an animal in the trap 110.

Figure 2A:
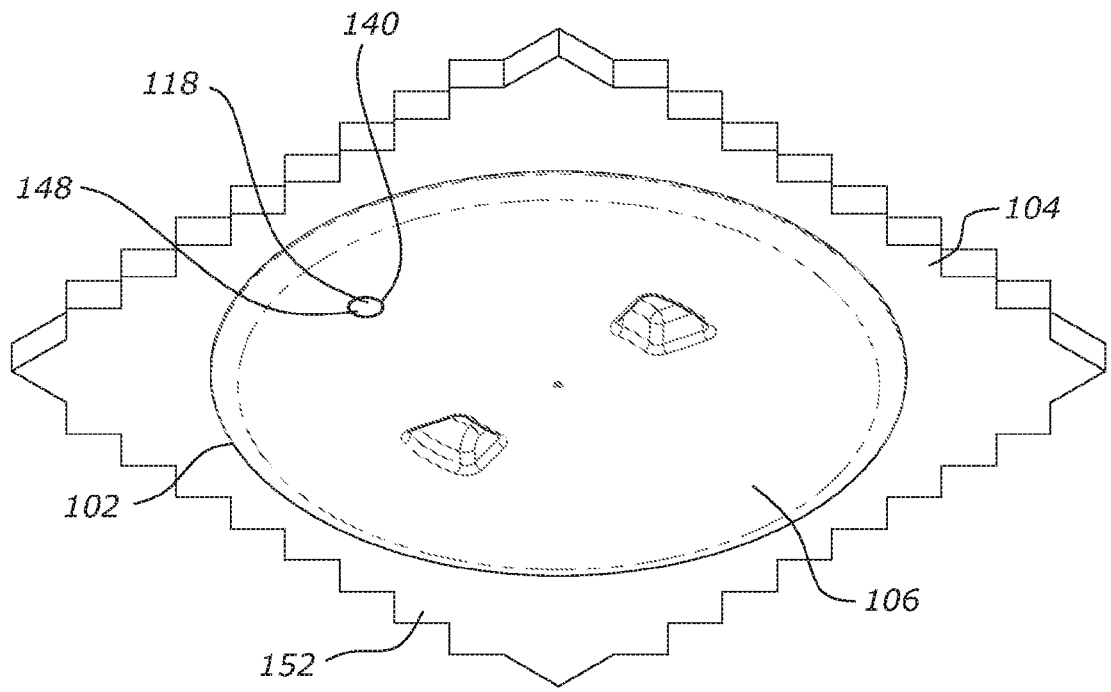
FIGS. 2A, 2B, and 2C are underside perspective views and a side sectional view respectively showing the trap of FIG. 1 mounted to the underside of the ceiling panel, with the trap set and the indicator in the recessed position and with the cover not shown.
Figure 2B:
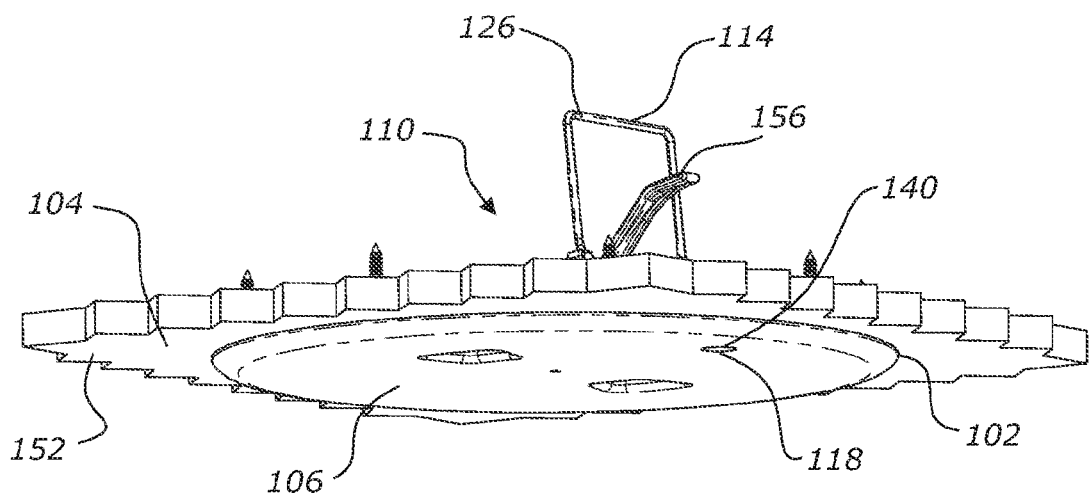
Figure 2C:
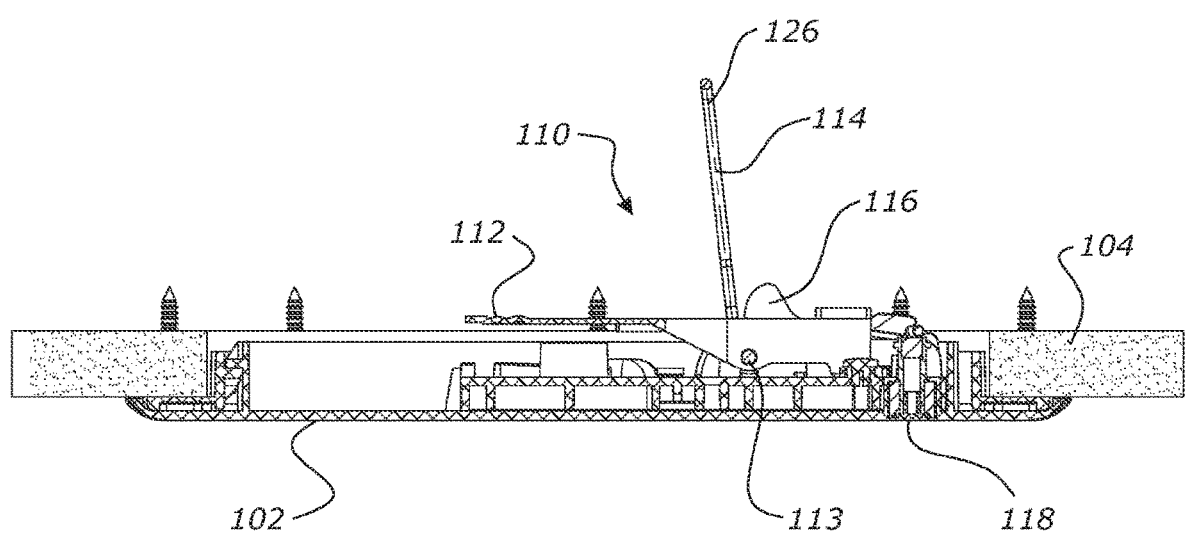
Figure 3A:
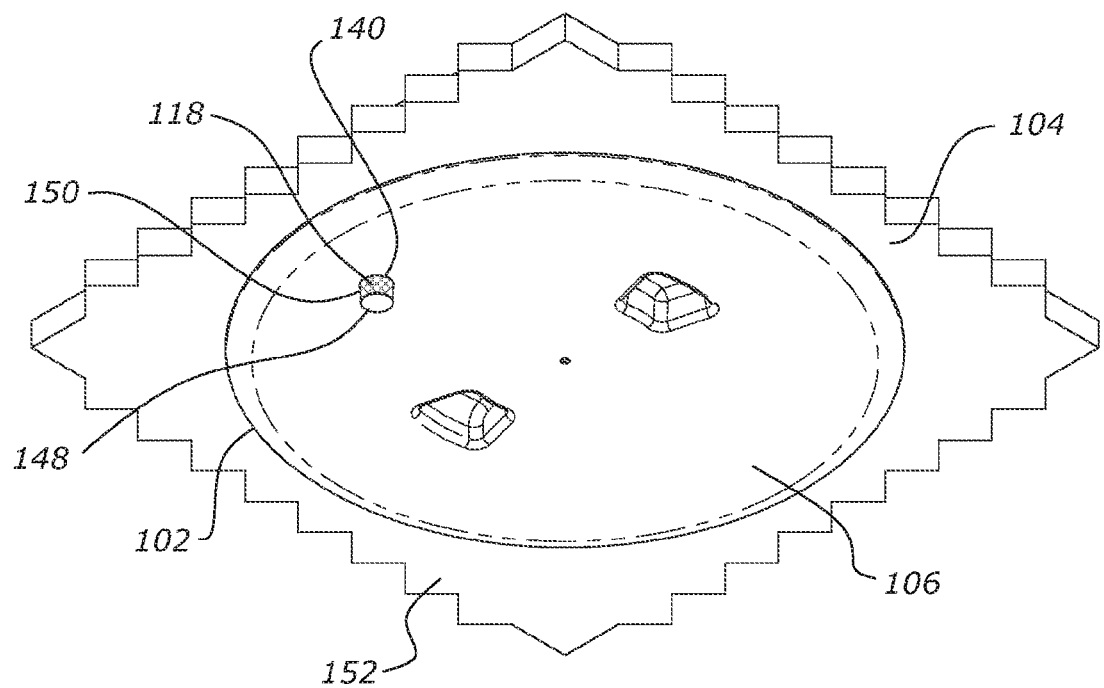
FIGS. 3A and 3B are underside perspective views similar to FIGS. 2A and 2B, but with the trap triggered and the indicator in the projecting position.
Figure 3B:
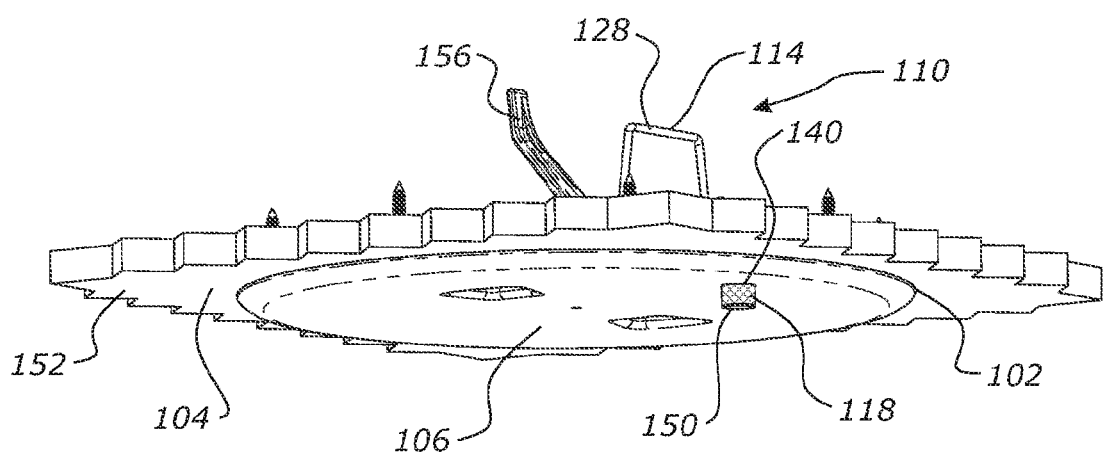

With reference to FIGS. 2A-2C and 3A-3B, the ceiling-mountable animal trap 100 has an indicator 118 that is movable between a recessed position in which it is at least substantially recessed in the housing 102 (FIGS. 2A-2C) and a projecting position in which it projects from the underside 106 of the housing 102 (FIGS. 3A-3B).

Referring to FIGS. 2B and 5 to 8A, the indicator 118 is configured to be held in the recessed position by the killing arm arrangement, and in this configuration by the killing arm 114, when the killing arm 114 is in the set position. Referring to FIGS. 3B and 9 to 12, the indicator 118 is configured to decouple from the killing arm 114 when the killing arm 114 moves from the set position towards the impact position so that the indicator 118 moves to the projecting position. In an alternative configuration such as that shown in FIGS. 20A to 21F, the indicator 118 is configured to be held in the recessed position by the pivot member 113 of the killing arm arrangement, when the killing arm 114 is in the set position. In that configuration, the indicator 118 is configured to decouple from the pivot member 113 when the killing arm 114 moves from the set position towards the impact position so that the indicator 118 moves to the projecting position.

The features of the trap 100 will now be described in more detail with reference to FIGS. 4-12. FIGS. 4-8A show the trap 100 in the set position. FIGS. 9-12 show the trap 100 in the impact position.

Figure 5:
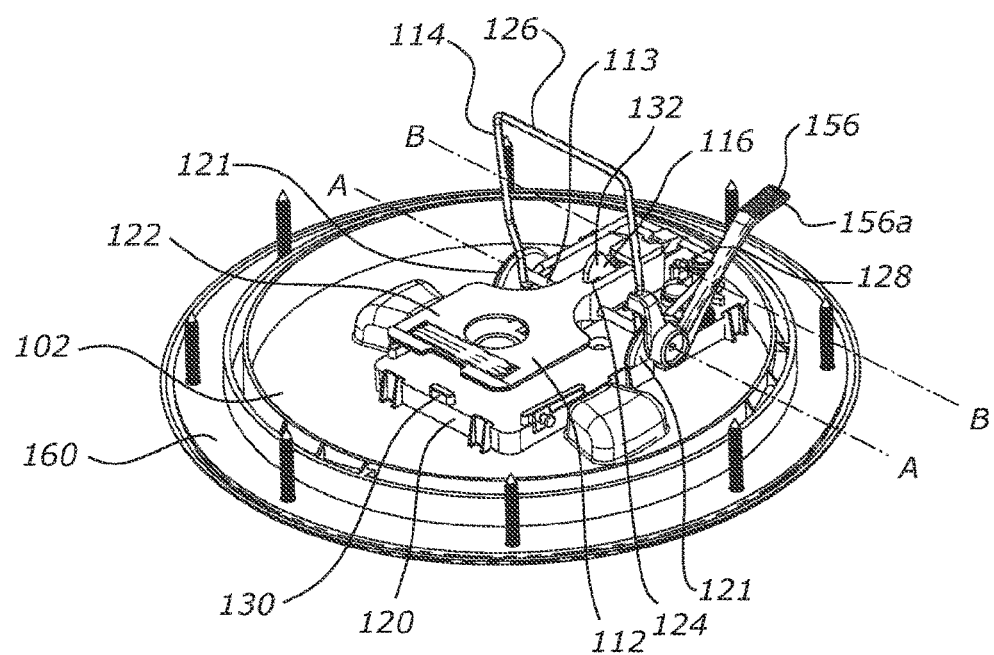
FIG. 5 is an overhead perspective view similar to FIG. 4 but with the cover not shown.
Figure 6:
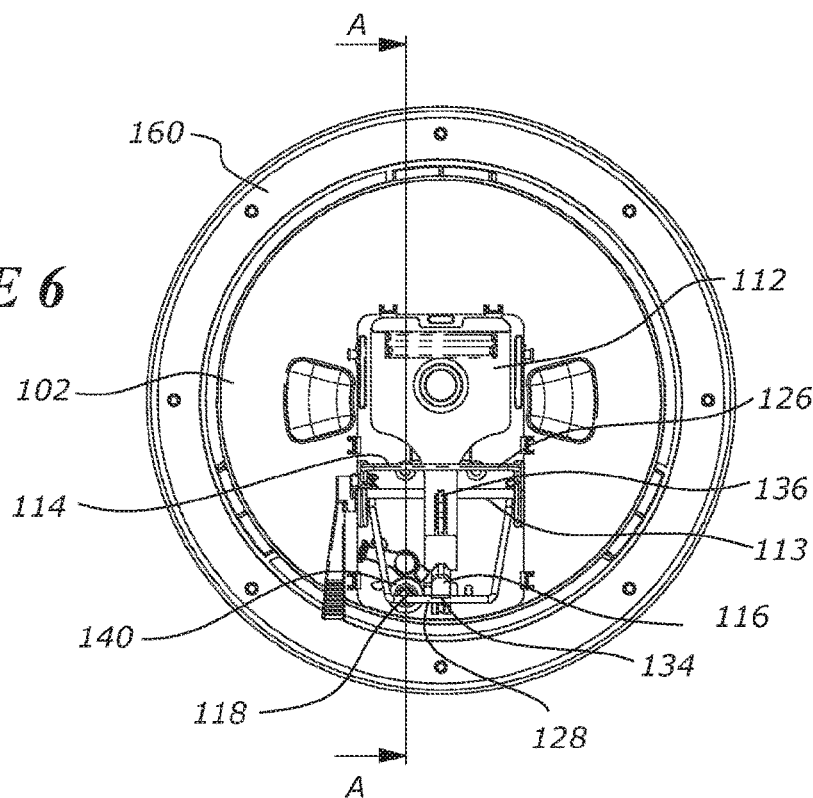
FIG. 6 is a plan view corresponding to FIG. 5.
Figure 7:
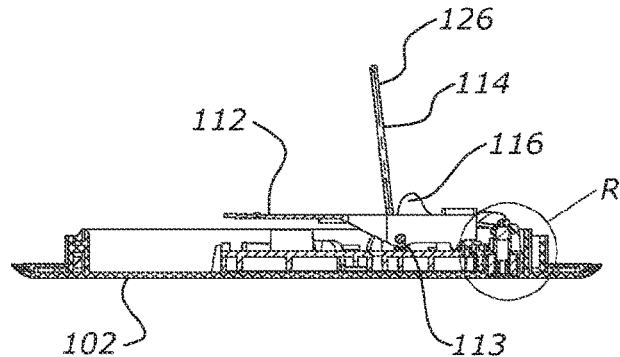
FIG. 7 is a section view along line A-A of FIG. 6, showing the trap set and the indicator in the raised position.

The treadle member 112 is pivotally mounted relative to a base 120 of the snap trap 110. The treadle member 112 is pivotable about an axis A-A and is mounted on a pivot member 113 between base brackets 121 (FIG. 5). The treadle member 112 has a free end 122 defining a contact plate for contact by an animal and a catch surface 124 for engagement with the trigger 116. Attractant bait such as food may be mounted to the contact plate or in the aperture shown in the contact plate. The treadle member 112 is biased away from the base 120 of the snap trap 100 in a known manner, for example by a leaf spring or compression spring (not illustrated).

The treadle member 112 and base 120 are formed from a strong, durable material, such as a polymeric material. By way of example only, the material could be a high impact engineering thermoplastic such as a PC/ABS (polycarbonate/acrylonitrile-butadiene-styrene) blend, or ABS. In alternative embodiments, at least a portion of the treadle member 112 and/or base 120 are formed from a metallic material, such as steel.

In the embodiment shown, the killing arm arrangement comprises the killing arm 114 that is pivotally mounted relative to the base 120 via the pivot member 113. The killing arm 114 is pivotable about the same axis A-A as the treadle member 112. In an alternative embodiment, the killing arm 114 is pivotable about a different axis.

The killing arm 114 has a killing portion 126 and a locking portion 128 substantially orthogonal to the killing portion 126. The locking portion 128 engages with the trigger 116 when the trap 110 is in the set position. When the treadle member 112 is moved, for example by an animal in the trap, the trigger 116 releases the locking portion 128 and the killing arm 114 pivots substantially 90° about the axis A-A to an impact position where the killing portion 126 contacts the animal. If no animal is present, in the impact position the killing portion 126 contacts a stop 130 protruding from the base 120 of the snap trap 110.

In an alternative embodiment, the killing arm 114 has a single portion that both engages with the trigger 116 and kills the animal. In this embodiment, the killing arm 114 pivots substantially 180° about the axis A-A from the set position to the impact position.

The killing arm 114 is made from a suitably strong, durable, rigid material such as steel. In the embodiment shown, the killing arm 114 is formed from a steel rod. In alternative embodiments, the killing arm 114 can take other forms.

Figure 14D:
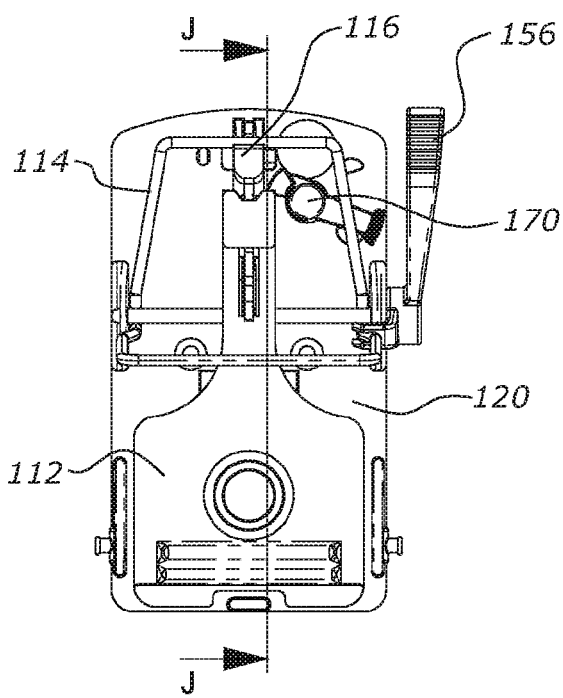
FIG. 14D is a plan view corresponding to FIG. 14*a;*
Figure 14E:
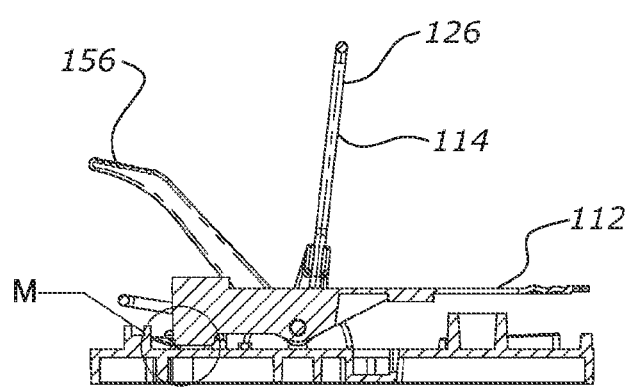
FIG. 14E is a section view along line 3-3 of FIG. 14D.
Figure 14F:
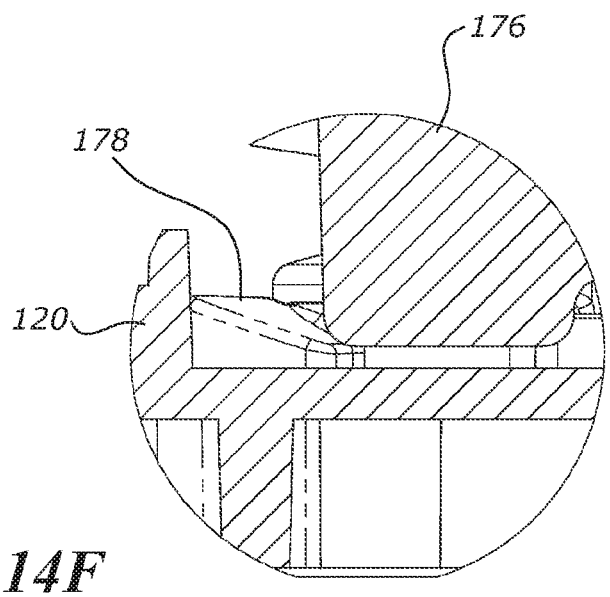
FIG. 14F is a section view of detail M of FIG. 14E.
Figure 15D:
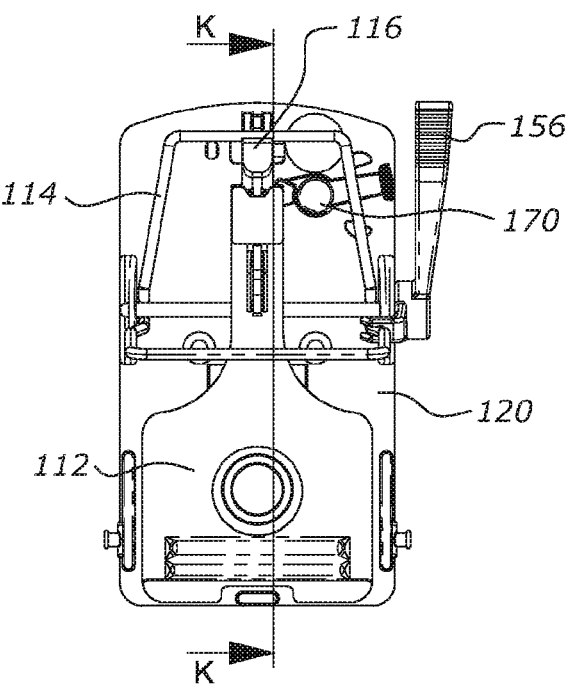
FIG. 15D is a plan view corresponding to FIG. 15A.
Figure 15E:
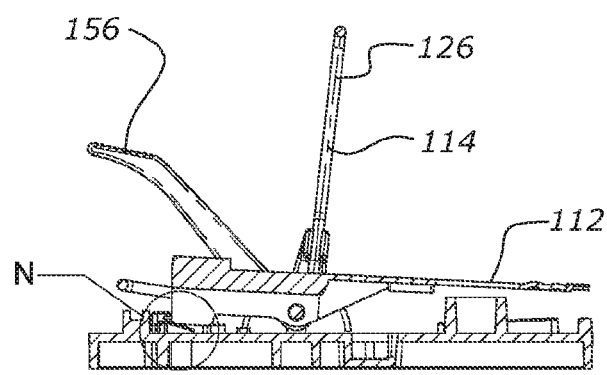
FIG. 15E is a section view along line K-K of FIG. 15D.
Figure 15F:
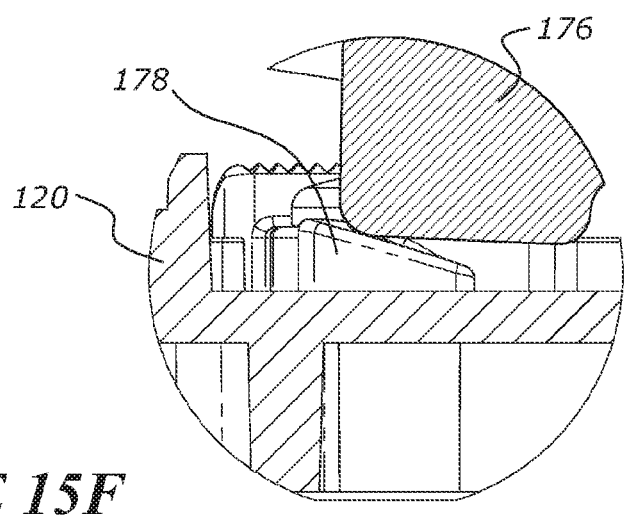
FIG. 15F is a section view of detail N of FIG. 15E.
Figure 16D:
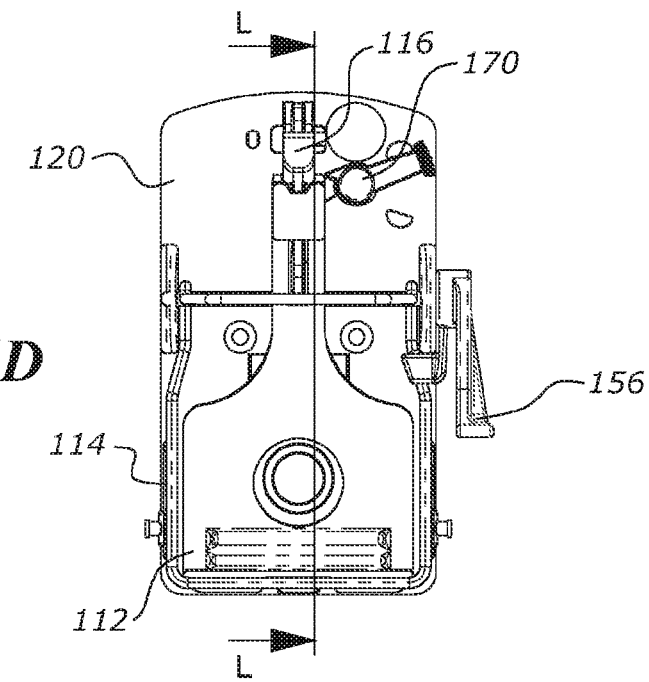
FIG. 16D is a plan view corresponding to FIG. 16A.
Figure 16E:
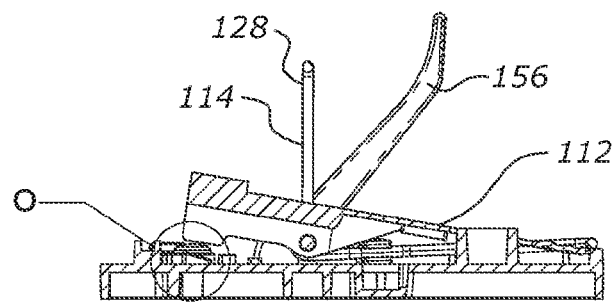
FIG. 16E is a section view along line L-L of FIG. 16D.
Figure 16F:
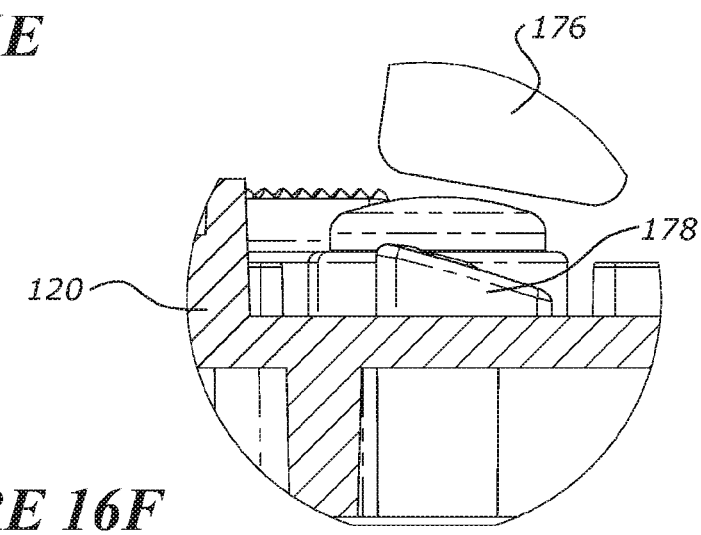
FIG. 16F is a section view of detail O of FIG. 16E.

The trigger 116 has a trigger member 132 that is pivotally mounted relative to the base 120 via a pivot member 125. The trigger member 132 is pivotable about an axis B-B. The trigger member 132 has an engagement portion 134 that is configured to engage with, and hold, the killing arm 114 when the killing arm 114 is in the set position. As shown in FIG. 14C for example, the trigger member 132 has a catch portion 136 in the form of a nose that is configured to engage with the catch surface 124 of the treadle member 112 when the killing arm 114 is in the set position. The catch portion 136 is configured to release from engagement with the catch surface 124 of the treadle member 112 upon movement of the treadle member 112 by an animal, to enable the trigger member 132 to pivot about the axis B-B and release the killing arm 114.

The trigger 116 is formed from a strong, durable material, such as a polymeric material. By way of example only, the material could be a high impact engineering thermoplastic such as a PC/ABS (polycarbonate/acrylonitrile-butadiene-styrene) blend, or ABS. In alternative embodiments, the trigger 116 is formed from a metallic material, such as steel.

In the embodiment shown, the indicator 118 comprises a magnet 138 mounted in the upper end of the indicator body, and the killing arm 114 comprises a magnetisable material, such as steel. The killing arm 114 and the indicator 118 are configured such that the indicator 118 is held in the recessed position by the killing arm 114 under magnetic force when the killing arm 114 is in the set position. In an embodiment, the killing arm 114 also comprises a magnet.

In an alternative embodiment, the killing arm 114 comprises a magnet, and the indicator 118 comprises a magnetisable material. It will be appreciated that when magnet(s) is/are used, there does not necessarily need to be any physical contact between the indicator and killing arm arrangement for the indicator to be held in the recessed position. The magnetic force could be sufficiently strong to hold the indicator without such physical contact. This is beneficial because it will minimise any reduction of killing arm speed/force that could occur if there was physical contact.

In an embodiment, the magnet(s) is/are sufficiently strong that the indicator 118 automatically moves from the projecting position to the recessed position when the killing arm 114 is in the set position. In an alternative embodiment, the indicator 118 is reset by a user after the killing arm 114 is placed in the set position, by pushing the indicator 118 toward the killing arm 114 such that the magnet(s) and/or magnetisable material are close enough to engage.

Figure 8A:
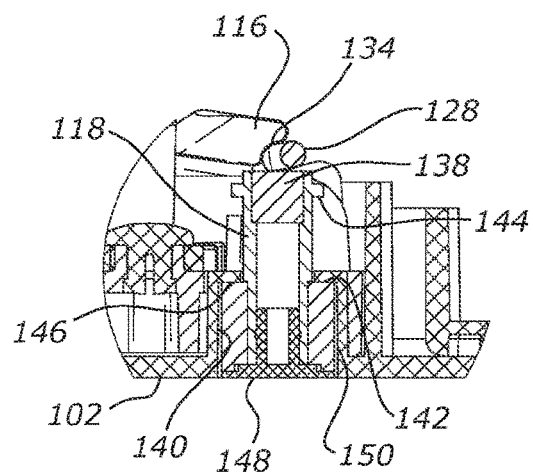
FIG. 8A is a section view of detail R of FIG. 7, showing the trap set and the indicator in the raised position.
Figure 8B:
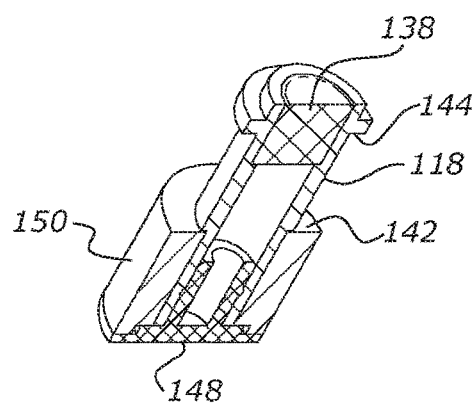
FIG. 8B is an overhead sectional perspective view of the indicator of the trap.
Figure 12:
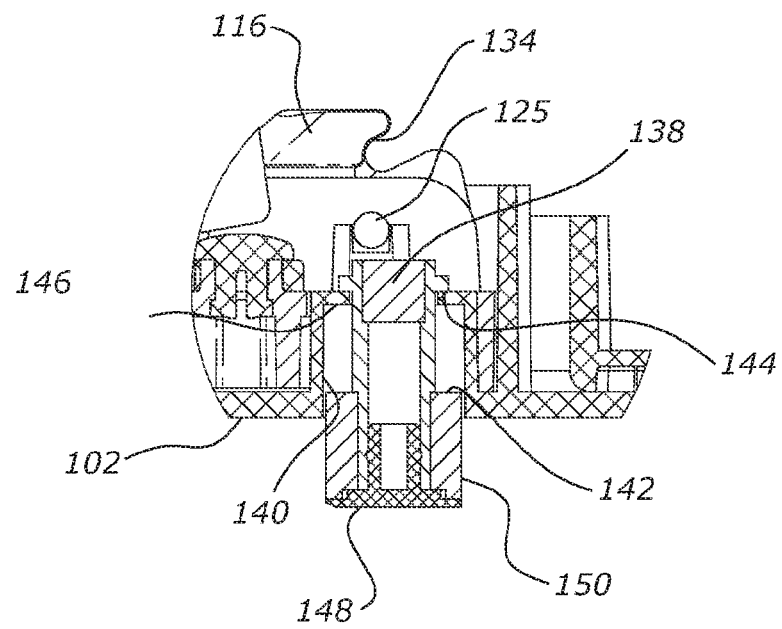
FIG. 12 is a section view of detail S of FIG. 11, showing the trap triggered and the indicator in the projecting position.

The indicator 118 moves within a recessed aperture 140 in the housing 102. The indicator 118 is has at least one lower stop 142 that prevents the indicator 118 from moving out of the aperture in an upwards direction as shown in FIGS. 8A and 8B. The indicator 118 is has at least one upper stop 144 that prevents the indicator 118 from moving out of the aperture in a downwards direction as shown in FIG. 12.

In the embodiment shown, the indicator 118 is a relatively loose fit in the aperture 140 in the housing, so that the indicator is configured to move to the projecting position solely under the influence of gravity, following decoupling from the killing arm 114.

In an alternative embodiment, the indicator 118 is biased toward the projecting position by a biasing member such as a spring. For example, a compression spring could be positioned between the lower stop 142 and an opposite surface 146 of the aperture 140 to bias the indicator toward the projecting position.

In an alternative embodiment, the indicator 118 is releasably coupled to the killing arm 114 by a biased latch. The extent of biasing of the killing arm 114 towards the impact position is greater than the extent of biasing of the biased latch, such that the indicator 118 is held in the recessed position by the killing arm 114, via the biased latch, when the killing arm 114 is in the set position. The biased latch releases so that the indicator 118 is decoupled from the killing arm 114 when the killing arm 114 moves from the set position towards the impact position.

By providing an indicator that decouples from the killing arm and moves to the projecting position when the trap is triggered, minimal wear of the indicator components occurs. The configuration using a magnet to couple/decouple the indicator as the killing arm moves from the set position to the impact position, and the arrangement where the indicator moves to the projecting position solely under the influence of gravity, result in minimal wear of the components. There is no significant reduction in killing force of the killing arm with this indicator configuration.

In the embodiment shown, the indicator 118 is fully recessed in the housing 102 when the indicator 118 is in the recessed position, see FIGS. 2A-B and 8A. It can be seen that the configuration of FIG. 2A-3B with the low profile housing mounted to the underside of the ceiling panel and the indicator configuration is aesthetically pleasing, yet readily allows a user to determine when the trap has been triggered so they know to check the trap and reset it if necessary. An underside 148 of the indicator 118 is substantially flush with the underside 106 of the housing 102 when the indicator 118 is in the recessed position. In an alternative embodiment, the underside 148 of the indicator 118 may be recessed (e.g. spaced above) relative to the underside 106 of the housing 102 when the indicator 118 is in the recessed position. An upper portion of the indicator may be exposed from the upper side of the housing, because that exposed portion of the indicator will not be visible from beneath the housing when the housing is mounted to the ceiling.

In an embodiment, a portion of the periphery 150 of the indicator comprises a different colour and/or pattern compared to an underside 148 of the indicator and the underside 106 of the housing. For example, the underside of the indicator and the underside of the housing may be coloured, or painted, to be the same colour as the surrounding panel, such as white, off-white, or cream for example. The portion of the periphery of the indicator may be a clearly contrasting colour such as red for example. The portion of the periphery 150 of the indicator 118 is exposed from the housing 102 when the indicator 118 is in the projecting position but not when the indicator 118 is in the recessed position.

In an embodiment, the underside 148 and the periphery 150 of the indicator are the same colour and/or pattern.

In the embodiment shown, the snap trap 110 has a setting lever 156 that is operatively connected to the killing arm 114, to enable a user to set the snap trap 110 without requiring the user to directly interact with the killing arm 114 or risk injury from that interaction. The setting lever 156 is pivotally mounted relative to the base 120 of the trap, and may for example be mounted on the pivot member 113 on the outside of one of the brackets 121. The setting lever is preferably operatively connected to the killing portion 126 of the killing arm 114. Alternatively, or additionally, the setting lever 156 may be operatively connected to the locking portion 128 of the killing arm 114.

When the killing arm is in the impact position, the user may grip a gripping portion 156a of the lever 156 to pivot the killing arm into the set position.

In embodiments without a setting lever 156, a user can set the snap trap 110 by applying force directly to the locking portion 128 of the killing arm 114 until the locking portion 128 engages with the trigger 116.

Figure 4:
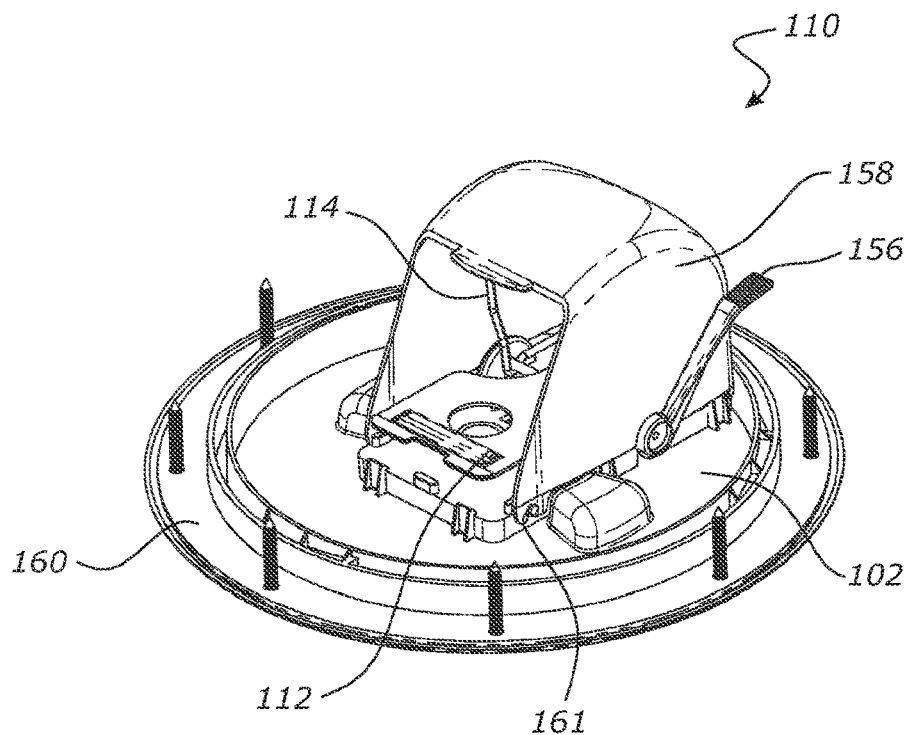
FIG. 4 is an overhead perspective view of the trap of FIG. 1, with the trap set.

Referring to FIG. 4, in an embodiment, the animal trap comprises a cover 158. The cover 158 defines an opening that provides an animal accessway adjacent the free end 122 of the treadle member 112.

In the embodiment shown, the cover 158 is pivotally mounted relative to the housing 102. The cover 158 is pivotable relative to the base 120 via a pivot 159 (FIG. 19A) and is movable between a covering position (shown in FIG. 4) in which the cover 158 substantially covers the snap trap 110 and a retracted position (shown in FIGS. 18B, 18C and 19B-19D) in which the snap trap 110 is substantially exposed. A front end of the cover may engage with the base 120 of the trap, such as via engagement features 161 (FIG. 4) to releasably retain the cover 158 in the covering position.

In an alternative embodiment, the pivot between the base 120 and the cover 158 may be at the front of the cover rather than the rear. A user can pivot the cover 158 forward to provide easy access to the sensitivity adjuster 170 (which is described in more detail below).

In an alternative embodiment, the cover 158 is removably mounted to the base 120 of the snap trap 110, for example with a push fit.

In the embodiment shown, the setting lever 156 is positioned externally of the cover 158. This configuration is advantageous because it enables the trap 110 to be set without having to move/remove the cover 158. It also means that there will be no human scent on the killing arm and little or no human scent in the housing, which could otherwise deter some animals from entering the housing.

The trap 110 may be provided with one of the lever 156 and cover 158, both of the lever 156 and cover 158, or neither.

Referring to FIGS. 2A-C and 3A-B, the underside 106 of the housing 102 is arranged to be substantially flush with an underside 152 of the ceiling 104, when the housing 102 is mounted to the underside 152 of the ceiling 104. In alternative embodiments, the housing 102 may protrude from the underside 152 of the ceiling 104, or may be recessed in the underside 152 of the ceiling 104.

In an embodiment, the treadle member 112 is arranged to be substantially flush with an upper side 154 of the ceiling 104, when the housing 102 is mounted to the underside 152 of the ceiling 104. An example is shown in FIG. 2C.

In the embodiment shown, the animal trap 100 comprises a mounting plate 160 for mounting to the ceiling 104. A hole can be cut in the ceiling 104 and the mounting plate 160 mounted to the ceiling by fasteners. The housing 102 is releasably engageable with the mounting plate 160.

In the embodiment shown, the housing 102 is engageable with, and releasable from, the mounting plate 160 by turning the housing 102 relative to the mounting plate 160.

In an embodiment, the animal trap 100 is provided in combination with a handle 162 that is usable by a user to turn the housing 102 relative to the mounting plate 160. The handle and the underside 106 of the housing 102 comprise complementary engagement features 164, 166 that enable the handle 162 to releasably engage with the underside 106 of the housing 102.

In an embodiment, the mounting plate 160 is an annular plate and the housing 102 comprises a circular shape. However, the mounting plate and housing can have any suitable shape, such as elliptical, square, rectangular, or any other suitable shape.

A peripheral portion of the housing 102 may be provided with a fold-up gripping portion (not shown) that can be used to carry the animal trap 100, but which can fold down flush against the periphery when the gripping portion is not in use.

In an embodiment, the animal trap 100 is a rodent trap. For example, the animal trap may be used for trapping mice or rats.

The snap trap 110 used in the ceiling-mountable animal trap 100 may have any one or more of the features outlined below. For example, the snap trap 110 used in the ceiling-mountable animal trap 100 may have the sensitivity adjuster 170 described below or may be provided without the sensitivity adjuster 170.

The ceiling-mountable animal trap 100 can be used as follows. A user provides an animal trap 100 as outlined above and sets the snap trap 110 so that the killing arm 114 is in the set position and the indicator 118 is in the recessed position. The user may place attractant bait on or in the treadle member. The user mounts the animal trap 100 to the underside 152 of a ceiling 104.

For example, the user may mount the animal trap 100 to the underside of a false ceiling. Alternatively, the user may mount the animal trap 100 to the underside 1 of a permanent ceiling. The user may mount the trap to a ceiling indoors or outdoors. For example, the user may mount the trap to outdoor eaves, or to an indoor manhole cover. All such exemplary variants are intended to be within the scope of the present invention.

In an embodiment, the animal trap 100 has a mounting plate 160 that is mounted to the ceiling 104, and the user mounts the trap 100 to the underside 152 of the ceiling 104 by engaging the housing 102 to the mounting plate 160 by turning the housing 102 relative to the mounting plate 160. In an embodiment, the user checks the animal trap 100 by disengaging the housing 102 from the mounting plate 160 by turning the housing 102 relative to the mounting plate 160.

In the normal set position of the trap, the indicator 118 is recessed in the housing 102 as shown in FIGS. 2A to 2C. If the trap is triggered, the indicator will move to the projecting position of FIGS. 3A and 3B, which will be clearly visible the user. The user checks the animal trap 100 if the indicator 118 is in the projecting position.

In an embodiment, the user checks the animal trap 100 by removing the animal trap 100 from the ceiling 104; e.g. by removing the housing from the mounting plate.

In an embodiment, after checking the animal trap 100, the user resets the snap trap 110, adds more attractant bait if needed, and mounts the animal trap 100 to the underside 152 of the ceiling 104; e.g. by mounting the housing to the mounting plate.

In an embodiment, the user uses the handle 162 to turn the housing 102 relative to the mounting plate 160 to mount or dismount the housing from the mounting plate. The handle allows the user to easily reach the trap on the ceiling panel.

The animal trap 100 used in the above method may have any one or more of the features outlined above in relation to the ceiling-mountable animal trap 100, or in relation to the snap trap 110 described below.

The ceiling-mountable trap provides a reliable indication that the trap has been triggered, so they know that they should check the trap to remove the dead animal and reset the trap if necessary.

FIGS. 20A to 21F show an alternative configuration of the ceiling-mountable trap 110'. Unless described otherwise below, the features, functionality, options, and method of use are the same as described herein, and like numerals indicate like parts with the addition of a prime (').

In the configuration shown in FIGS. 20A to 21F, rather than being arranged in the upper side of the housing 102' to be substantially horizontal when the housing 102' is mounted to the ceiling, the snap trap 110' is arranged to be upright when the housing 102' is mounted to the ceiling. In the form shown, the snap trap 110' is arranged to be substantially vertical when the housing 102' is mounted to the ceiling, but it could alternatively be arranged on a different angle. The upper side 108' of the housing comprises an upright member 108a' that extends upwardly from a floor of the housing, to support the snap trap 110' in the upright configuration in the upper side of the housing. The upright member 108a' may be integrally formed with the remainder of the housing 102' or may be connected to the remainder of the housing 102'. The indicator is movably mounted in a recess in the upright member 108a'.

As with the configuration described above, the indicator 118' is movable between a recessed position (FIG. 20A) in which it is at least substantially recessed in the housing 102' and a projecting position (FIG. 21A) in which it projects from the underside 106' of the housing. The indicator 118' is configured to be held in the recessed position by the killing arm arrangement when the killing arm 114' is in the set position (FIG. 20A, 20B), and the indicator 118' is configured to decouple from the killing arm arrangement when the killing arm 114' moves from the set position (FIG. 20A, 20B) towards the impact position (FIG. 21A, 21B) so that the indicator moves to the projecting position. This configuration differs from that described above in that the indicator 118' is configured to be held in the recessed position by the pivot member 113' of the killing arm arrangement when the killing arm 114' is in the set position, and is configured to decouple from the pivot member 113' when the killing arm 114' moves from the set position towards the impact position so that the indicator 118' moves to the projecting position.

The pivot member 113' is configured to be in a first position (FIG. 20A, 20B, 20E, 20F) in which it is relatively close to the indicator 118' when the killing arm 114' is in the set position, and is configured to move from the first position to a second position (FIG. 21A, 21B, 21E, 21F) in which it is relatively far from the indicator 118' when the killing arm 114' moves from the set position towards the impact position. In the form shown, the pivot member 113' is configured to move on an arcuate path from the first position to the second position, about the killing arm 114' pivot axis A'-A'. Alternatively, the pivot member 113' could be configured to move on a substantially linear path from the first position to the second position, such as in a direction to the right relative to the snap trap base 120' and toward the killing arm 114' in the orientation shown in FIG. 20E.

It is not necessary for the pivot member 113' to remain in the second position after the snap trap is triggered; that is only needed until the indicator 118' has been released. The impact of the killing arm 114' on the snap trap base 120' when the killing arm 114' reaches the impact position will also help ensure that that the indicator 118' is released when the trap is triggered.

The pivot member 113' is operatively connected to the killing arm 114' to move from the first position to the second position when the killing arm 114' moves from the set position toward the impact position. In the form shown, the extent of movement of the pivot member 113' is less than the extent of movement of the killing arm, and is limited by the V-shape of the recess 120a' in the snap trap base 120'. The pivot member 113' is operatively connected to the killing arm 114' by a biasing member 115' (FIG. 20C), e.g. the torsion spring, that biases the killing arm 114' toward the impact position.

In an embodiment, the pivot member 113' pivots up to about 10° from the first position to the second position. In an embodiment, the pivot member 113' pivots about 7° from the first position to the second position.

In an alternative embodiment, the extent of movement of the pivot member is substantially the same as the extent of movement of the killing arm. For example, the pivot member could be connected to or integrally formed with the killing arm to move with the killing arm. This could enable a stronger magnet to be used which may automatically lift the indictor from the projecting position to the recessed position when the killing arm 114' is returned to the set position.

In an embodiment, the killing arm pivots substantially 90° from the set position to the impact position. In an alternative embodiment, the killing arm pivots substantially 180° from the set position to the impact position.

In the form shown, the pivot member comprises a shaft or other rigid elongate member.

The pivot member 113' suitably comprises at least a first portion 113a' adjacent a first surface of the snap trap corresponding to the location of the killing arm 114' and a second portion 113b' extending at an angle relative to the first portion 113a' and adjacent a second surface of the snap trap. In such an embodiment, the second portion 113b' may be configured to be positioned relatively close to the indicator 118' to hold the indicator in the recessed position when the killing arm is in the set position. For example, the pivot member may be substantially L-shaped. Alternatively, a slot may be provided in the snap trap base 120' and the second portion 113b' of the pivot member may project through the slot. In that configuration, the pivot member may be substantially T-shaped rather than substantially L-shaped.

In the configuration shown, the pivot member 113' comprises a third portion 113c' extending at an angle relative to the second portion 113b' and adjacent to a third surface of the snap trap. The third portion 113c' is configured to be positioned relatively close to the indicator 118' to hold the indicator in the recessed position when the killing arm 114' is in the set position. The third surface of the snap trap is opposite to the first surface of the snap trap, and the pivot member 113' is substantially U-shaped.

The indicator 118' is configured to move to the projecting position solely under the influence of gravity, following decoupling from the pivot member 113'. Alternatively, the indicator 118' could be biased toward the projecting position by a biasing member such as a spring.

In the configuration shown, one of the pivot member 113' and the indicator 118' comprises a magnet 138', and the other of the pivot member and the indicator comprises a magnet or a magnetisable material, the pivot member 113' and indicator 118' configured such that the indicator is held in the recessed position by the pivot member under magnetic force when the killing arm is in the set position.

It will be appreciated that when magnet(s) is/are used, there does not necessarily need to be any physical contact between the indicator 118' and pivot member 113' for the indicator 118' to be held in the recessed position. The magnetic force could be sufficiently strong to hold the indicator without such physical contact. This is beneficial because it will minimise any reduction of killing arm 114' speed/force that could occur if there was physical contact.

In an alternative configuration, the indicator 118' is releasably coupled to the pivot member 113' by a biased latch, such that the indicator is held in the recessed position by the pivot member 113', via the biased latch, when the killing arm 114' is in the set position, and the biased latch releases so that the indicator 118' is decoupled from the pivot member 113' when the killing arm 114' moves from the set position towards the impact position.

In another alternative configuration, the indicator 118' is releasably coupled to the pivot member 113' by a frictional engagement which is overcome when the killing arm 114' moves from the set position towards the impact position.

As shown, the indicator 118' may be fully recessed in the housing 102' when the indicator is in the recessed position. The underside 148' of the indicator 118' is advantageously substantially flush with the underside 106' of the housing 102' when the indicator 118' is in the recessed position. An upper portion of the indicator may be exposed from the upper side of the housing, because that exposed portion of the indicator will not be visible from beneath the housing when the housing is mounted to the ceiling.

A portion of the periphery 150' of the indicator 118' advantageously comprises a different colour and/or pattern compared to an underside 148' of the indicator and the underside of the housing, wherein the portion of the periphery of the indicator is exposed from the housing when the indicator is in the projecting position but not when the indicator is in the recessed position.

The underside of the housing 106' is arranged to be substantially flush with an underside of the ceiling, when the housing is mounted to the underside of the ceiling.

The snap trap 110' may further comprise the setting lever 156' that is operatively connected to the killing arm, to enable a user to set the snap trap.

The animal trap 100' may comprise the cover 158' described herein.

The setting lever 156' may be positioned externally of the cover 158'.

In an embodiment, the animal trap 100' is a rodent trap. For example, the animal trap may be used for trapping mice or rats. Additionally, or alternatively, the animal trap may be used for trapping mustelids such as ferrets, stoats, or weasels.

In an embodiment, the animal trap 100' comprises the mounting plate 160 described herein for mounting to the ceiling. In an embodiment the animal trap 100' is provided in combination with the handle 162 described herein that is usable by a user to turn the housing relative to the mounting plate.

Although in this configuration the snap trap 110' is arranged to be on an upright orientation when the housing 102' is mounted to the ceiling, the snap trap 110' could alternatively be arranged to be substantially horizontal when the housing 102' is mounted to the ceiling and the treadle plate could, for example, be substantially flush with an upper surface of the ceiling panel. The snap trap 110' could be supported in a raised position above the base of the housing so that the pivot arm 113' can hold and release the indicator 118'. However, the upright configuration of the snap trap 110' is preferred, because it creates a smaller footprint, meaning that only a smaller aperture needs to be made in the ceiling and the peripheral size of the housing 102' can be smaller.

Figure 22A:
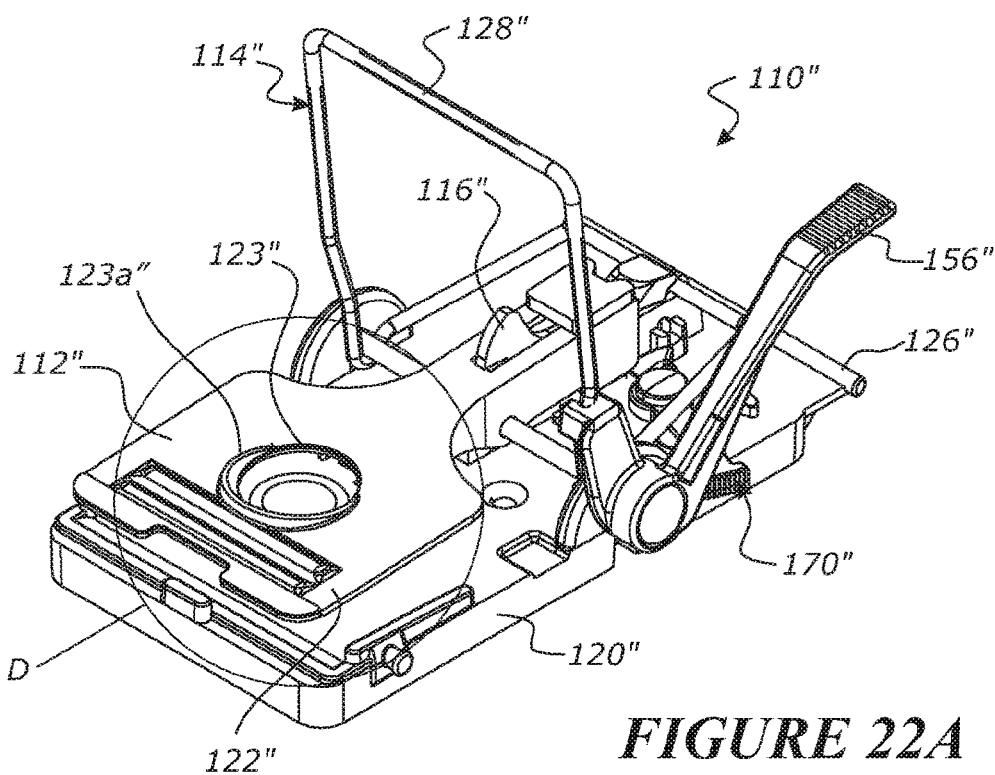
FIG. 22A is a front overhead perspective view of an alternative embodiment snap trap for use in any of the animal traps.
Figure 22B:
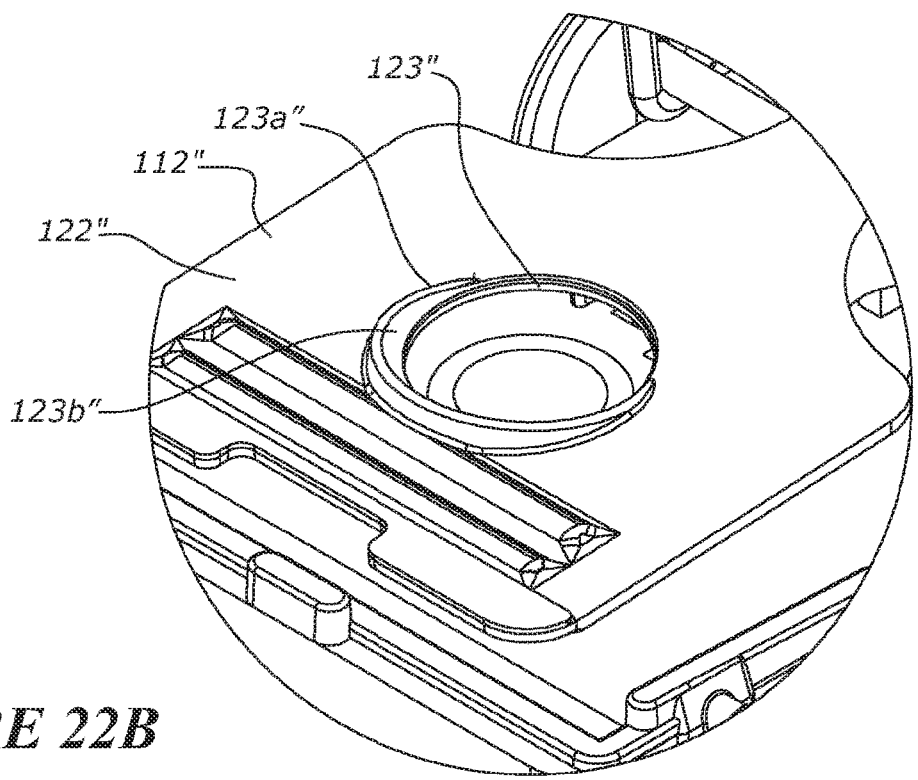
FIG. 22B is an enlarged detail view of region D of FIG. 22A.
Figure 23:
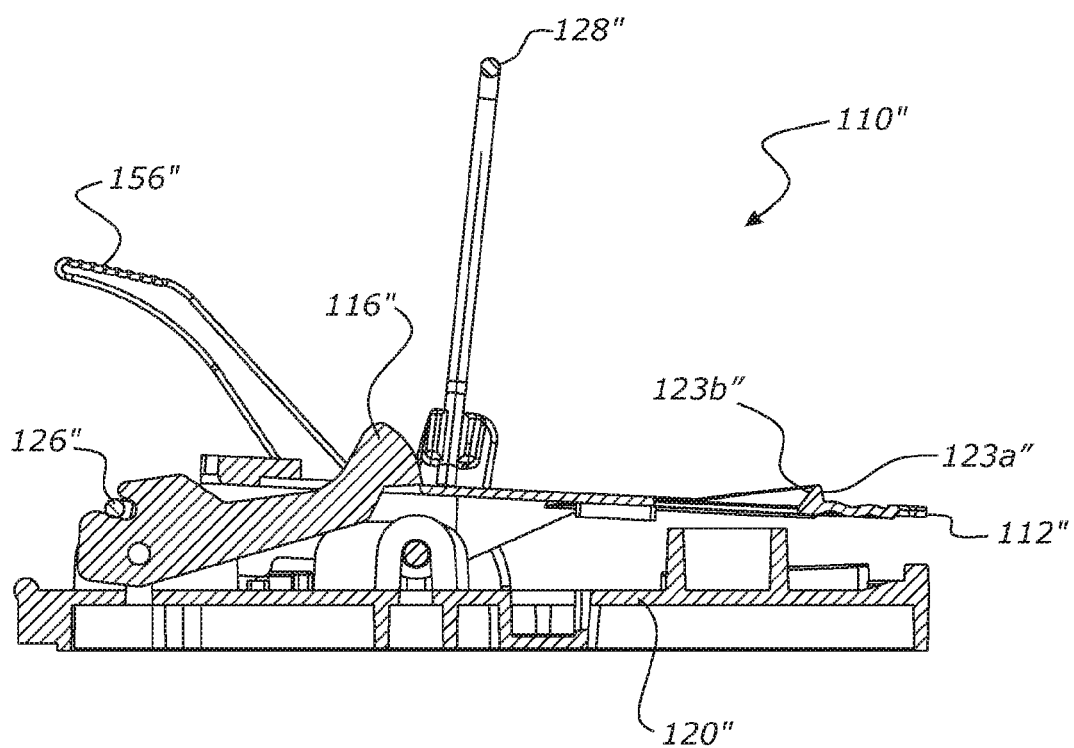
FIG. 23 is a side sectional view of the snap trap of FIGS. 22A and 22B.

FIGS. 22A-23 show an alternative configuration snap trap 110" for use in any of the animal traps described herein. Unless described otherwise below, the features, functionality, options, and method of use are the same as described herein for the snap trap 110, and like numerals indicate like parts with the addition of a double prime (").

In this configuration, the free end 122" of the treadle member that defines the contact plate for contact by an animal is provided with a feature to inhibit an animal grabbing onto the periphery of the aperture 123". The aperture 123" provides access to the bait in a bait receptacle in the base 120" of the snap trap. The inhibiting feature comprises a projecting rim 123a" that extends from the contact plate in a direction away from the base 120" of the snap trap. The projecting rim 123a" is provided along at least the portion of the periphery of the aperture 123" that is closest to the free end of the treadle plate. As shown, the projecting rim 123a" may be provided around at least half of the periphery of the aperture 123".

An angled surface 123b" of the projecting rim 123a" that is closest to the aperture has an angle that is non-parallel and non-perpendicular to the contact plate. The angle may, for example, be between about 30 degrees and about 60 degrees relative to the contact plate, and may for example be about 45 degrees relative to the contact plate.

The snap trap 110" can be used in any of the animal traps described herein. However, the snap trap 110" is particularly advantageous if the snap trap 110" will be oriented vertically in use, such as in animal traps of FIGS. 18A-21F for example. When the snap trap 110" is oriented vertically, an animal such as a mouse will not be able to use the periphery of the aperture 123" as a foothold to access bait. The projecting rim 123a" will mean the animal cannot get any purchase on the periphery of the aperture 123". Pressure exerted by the animal on the angled surface 123b" will move the contact plate of the treadle member 112" toward the base 120", triggering the snap trap 110".

The snap trap 110, 110', 110" may also have a sensitivity adjuster 170 integrated into the trap, which is described in more detail with reference to FIGS. 13A-17C.

Figure 13A:
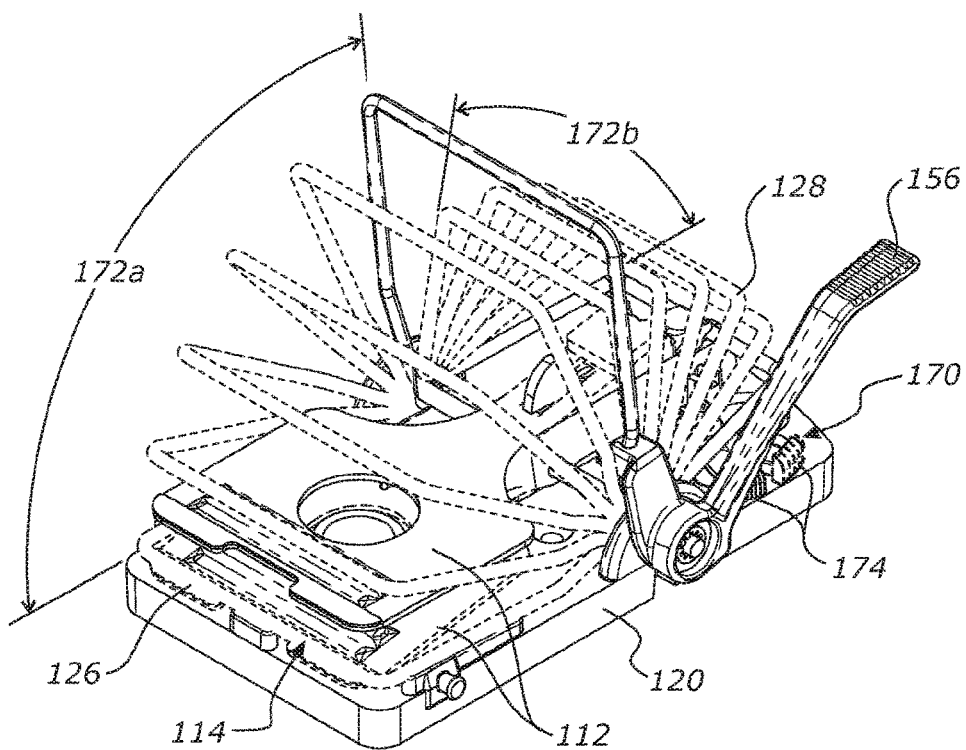
FIG. 13A is an overhead perspective view of the snap trap of FIG. 1, showing the impact zone as the killing arm moves from the set position to the impact position.
Figure 13B:
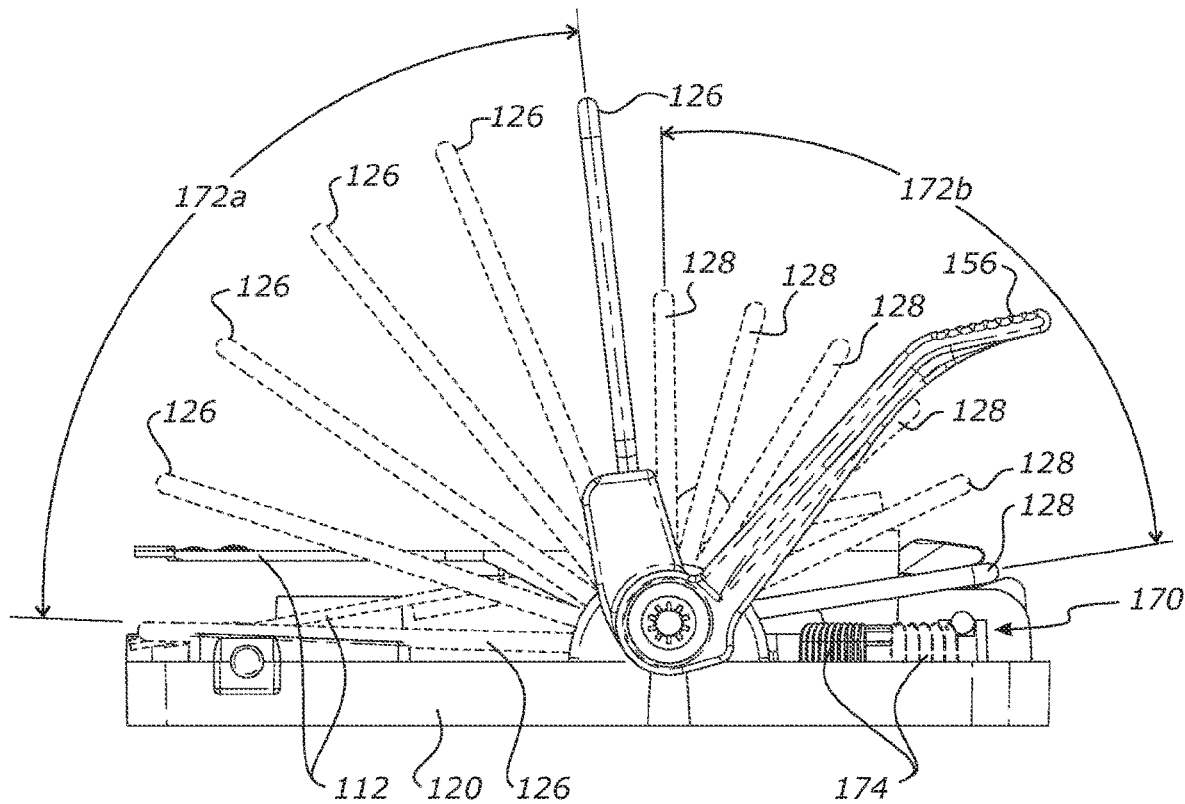
FIG. 13B is a side view corresponding to FIG. 13A.

With reference to FIGS. 13A and 13B, the killing arm 114 is pivotally mounted relative to the base 120 and is movable through an impact zone from a set position to an impact position. The impact zone is represented by reference numbers 172a and 172b, and is the region that the killing portion 126 and the locking portion 128 of the killing arm (including their respective cross-members and side members) travel through as the killing arm 114 moves from the set position to the impact position. For a killing arm that only has a killing portion 126 and no locking portion 128, the impact zone is the region that the killing portion (including its cross-member and side members) travels through as the killing arm moves from the set position to the impact position. That is, it is a region in which a person could be injured if they have a finger or hand in that region when the snap trap is triggered.

The killing arm 114 is biased toward the impact position.

The trigger 116 couples the treadle member 112 to the killing arm 114 and is arranged to release the killing arm 114 from the set position upon the treadle member 112 being moved by an animal in the snap trap 110.

The sensitivity adjuster 170 adjusts the sensitivity of the snap trap 110. The sensitivity adjuster 170 has an adjuster member 174 that is adjustable by a user externally of the impact zone 172 to adjust an angle of the treadle member 112 relative to the base 120. Adjusting the angle of the treadle member 112 relative to the base 120 adjusts the force that is required to move the treadle member 112 to release the killing arm 114 from the set position.

The sensitivity adjuster 170 has a first, high force, adjustment position in which a relatively large force is required to move the treadle member 112 and a second, low force, adjustment position in which a relatively low force is required to move the treadle member 112. FIGS. 14A-F show the sensitivity adjuster 170 in the first, high force, adjustment position with the killing arm in the set position. FIGS. 15A-F show the sensitivity adjuster 170 in the second, low force, adjustment position with the killing arm 114 in the set position.

In an embodiment, the sensitivity adjuster 170 can be set to one or more intermediate adjustment positions between the first, high force adjustment position and the second, low force, adjustment position.

The treadle member 112 has a free end 122 for contact by an animal. In the first adjustment position of the sensitivity adjuster 170 a spacing between the free end 122 and the base 120 of the snap trap is relatively large, and in the second adjustment position of the sensitivity adjuster 170 a spacing between the free end 122 and the base 120 of the snap trap is relatively small.

The sensitivity adjuster 170 optionally has a third, triggered, adjustment position in which the treadle member 112 is moved by the sensitivity adjuster 170 to a position that triggers the snap trap. FIGS. 16A-F show the sensitivity adjuster 170 in the third, triggering, adjustment position with the killing arm 114 in the impact position.

The trigger 116 comprises the trigger member 132 that is pivotally mounted relative to the base 120. The trigger member 132 has the engagement portion 134 that is configured to engage with, and hold, the killing arm 114 when the killing arm 114 is in the set position. The trigger member 132 has the catch portion 136 that is configured to engage with the catch surface 124 of the treadle member 112. The catch portion 136 is configured to release from engagement with the catch surface 124 of the treadle member 112 upon movement of the treadle member 112 by an animal, to enable the trigger member 112 to pivot and release the killing arm 114 to move under bias through the impact zone 172 to the impact position.

The catch portion 136 of the trigger member 132 is configured to overlap with the catch surface 124 of the treadle member 112 when the trap is set. The extent of overlap of the catch portion 136 of the trigger member 132 and the catch surface 124 of the treadle member 112 is configured to vary depending on the adjusted sensitivity position of the sensitivity adjuster 170.

Referring to FIG. 14C, there is a relatively large overlap of the catch portion 136 of the trigger member 132 and the catch surface 124 of the treadle member 112 in the first, high force, adjustment position of the sensitivity adjuster 170.

Referring to FIG. 15C, there is a relatively small overlap of the catch portion 136 of the trigger member 132 and the catch surface 124 of the treadle member 112 in the second, low force, adjustment position of the sensitivity adjuster 170.

Referring to FIG. 16C, there is no overlap of the catch portion 136 of the trigger member 132 and the catch surface 124 of the treadle member 112 in the third, triggered, adjustment position of the sensitivity adjuster 170.

In the embodiment shown, the adjuster member 174 is configured to engage with a portion 176 of the treadle member 112 that is opposite to the free end 122 of the treadle member 112. The adjuster member 174 is configured to remain in engagement with the portion 176 of the treadle member 112 in both the first, high force, and the second, low force, adjustment positions of the sensitivity adjuster 170. Alternatively, the adjuster member 170 may be disengaged from the portion 176 of the treadle member 112 in the first, high force, adjustment position of the sensitivity adjuster 170, but may be engaged with the portion 176 of the treadle member 112 in the second, low force, adjustment position of the sensitivity adjuster 170.

In the embodiment shown, the adjuster member 174 comprises a cam portion 178 at an end of the adjuster member 174. The cam portion has a tapered or wedge-type shape. The cam portion 178 is configured to engage with the treadle member 112 and adjust the angle of the treadle member 112 upon movement of the adjustment member by a user. The treadle member 112 is pivotally mounted about a pivot axis A-A relative to the base 120, and the adjuster member 174 is pivotally mounted relative to the base 120 about a vertical pivot axis that is transverse to the pivot axis A-A of the treadle member 112.

In an alternative embodiment, the treadle member 112 is pivotally mounted about a pivot axis A-A relative to the base 120, and the adjuster member 174 is rotatable relative to the base 120 about a horizontal rotation axis that is parallel to the pivot axis A-A of the treadle member 112.

In an alternative embodiment, the adjuster member 174 is linearly slideable relative to the base 120, e.g. in a rear-forward direction of the trap from the rear of the base 120.

In the embodiment shown, the adjuster member 174 has a gripping portion 180 for gripping by a user to move the adjuster member 174. The gripping portion 180 is external of the impact zone 172.

Figure 17A:
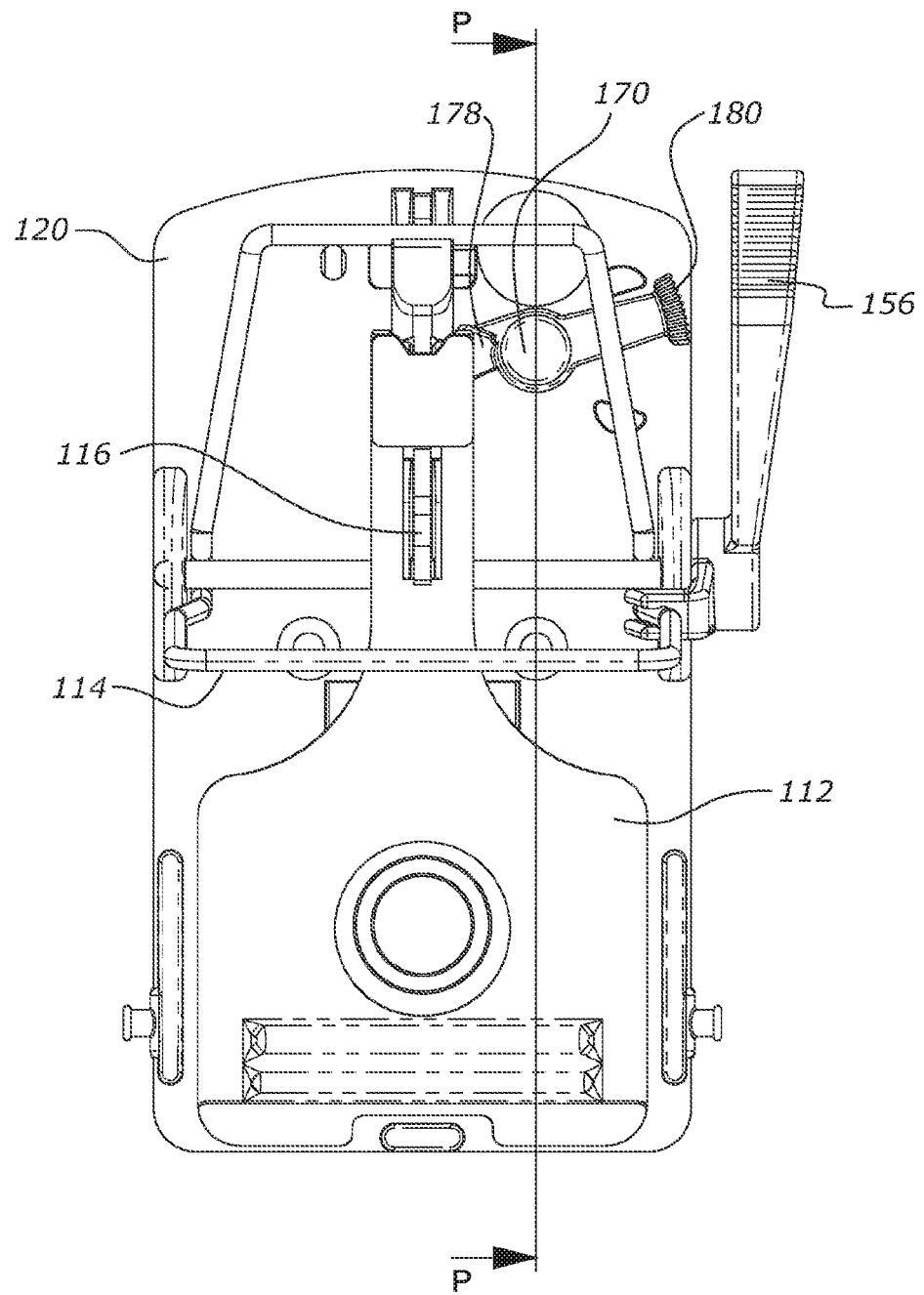
FIG. 17A is a plan view of the trap of FIG. 13A.
Figure 17B:
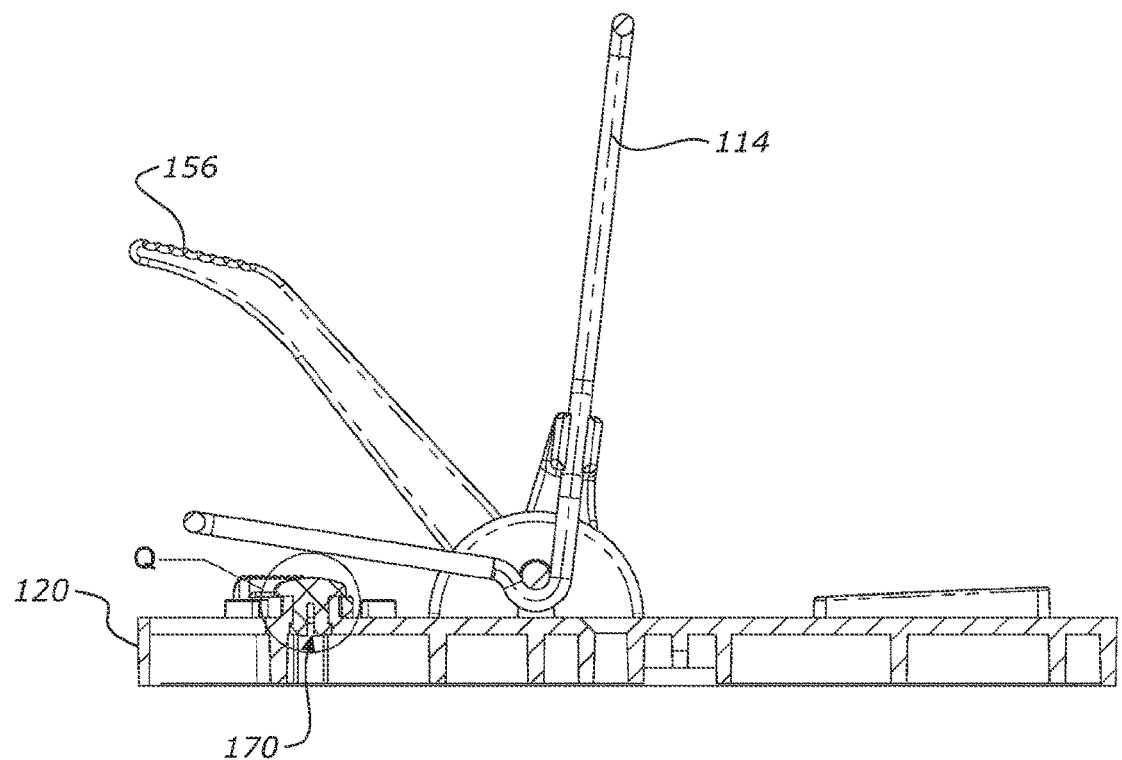
FIG. 17B is a section view along line P-P of FIG. 17A.
Figure 17C:
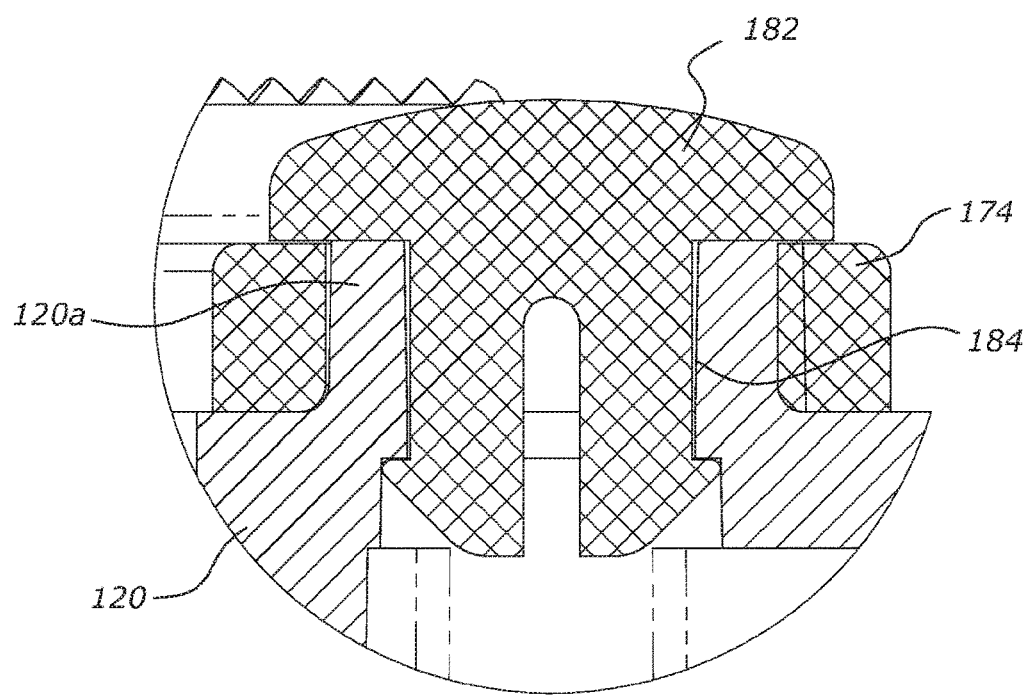
FIG. 17C is a section view of detail Q of FIG. 17B, showing the pivot mounting of the adjustment member to the trap base.

Referring to FIGS. 17A-C, the adjuster member 174 pivots about a boss 120a in the base 120 of the snap trap. A push fastener 182 is in snap engagement with an aperture 184 in the boss 120a, and holds the adjuster member 174 in position on the boss 120a.

In an embodiment, the adjuster member 174 and the base 120 of the snap trap have complementary raised portions/indentations to provide a user with tactile feedback of indexed sensitivity adjustment positions.

In an embodiment, the adjuster member 174 and/or the base 120 of the snap trap have contrasting marks to provide a user with visual feedback of the sensitivity setting. In an embodiment having a cover 158, the cover may have marks to provide a user with visual feedback of the sensitivity setting.

The sensitivity adjuster 170 enables a user to easily and reliably adjust the sensitivity of the snap trap for smaller or larger animals; e.g. mice or rats. Because the sensitivity adjuster 170 is outside the impact zone 172a, 172b of the killing arm 114, the sensitivity can be adjusted without the risk of injury, even if the killing arm is set. If the sensitivity adjuster is provided with the third, triggered, adjustment position, it provides a controlled way for the user to trigger the snap trap with little risk of injury to the user.

The traps 100, 110, 100', 110', 110" may be provided with both the sensitivity adjuster 170 and the indicator 18. Alternatively, the traps 100, 110, 100', 110', 110" may have the sensitivity adjuster 170 but no indicator.

Figure 18C:
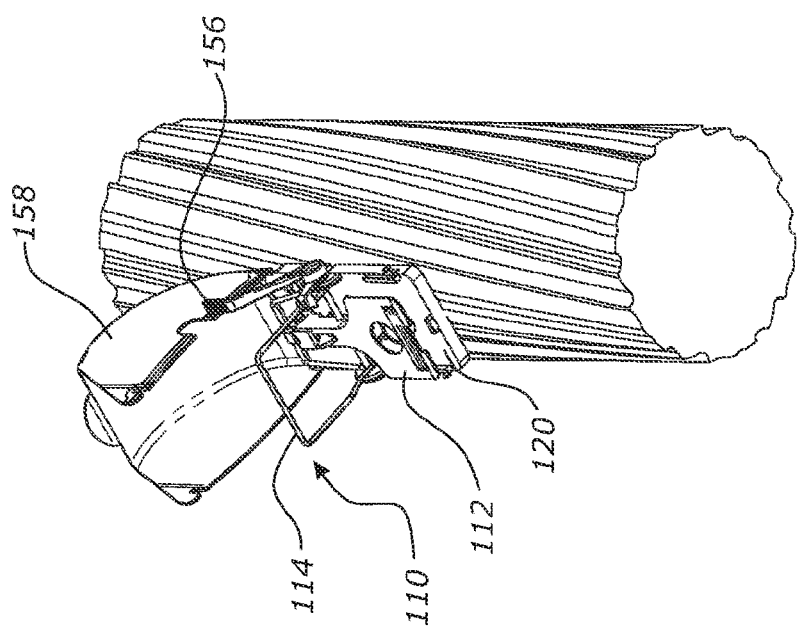
FIG. 18C is an underside perspective view corresponding to FIG. 18B.
Figure 18B:
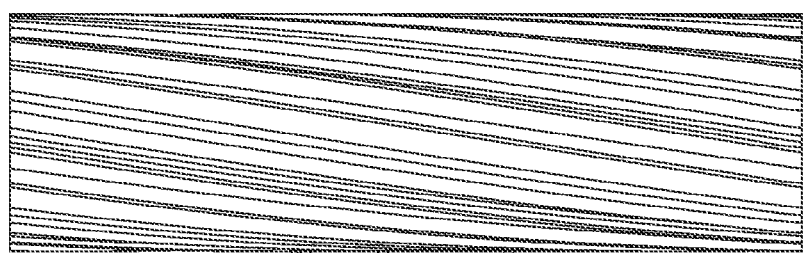
FIG. 18B is a side view of the trap of FIG. 18A, with the pivoting cover raised.
Figure 18A:
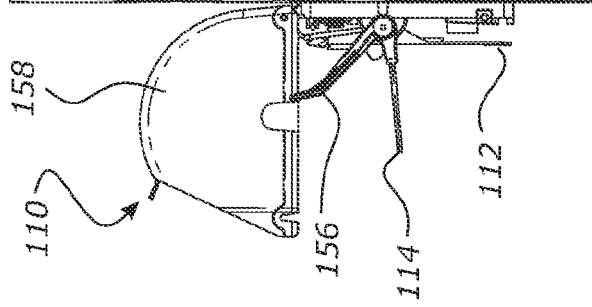
FIG. 18A is a front view showing a trap of FIG. 13A mounted to an upright post or tree.
Figure 18A:
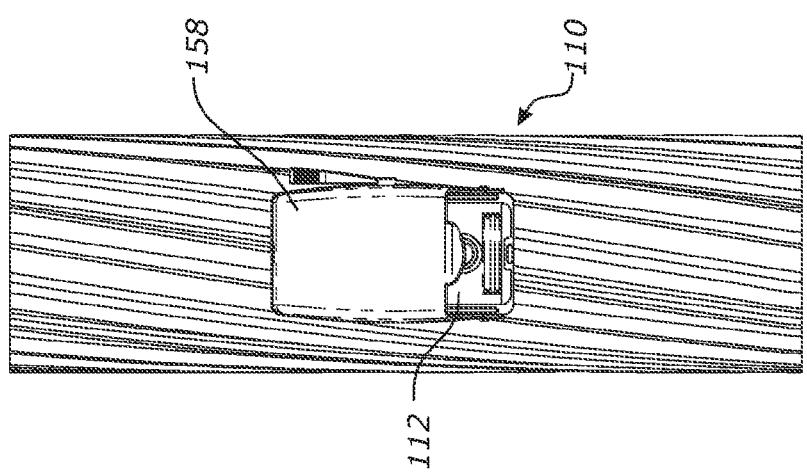
Figure 19A:
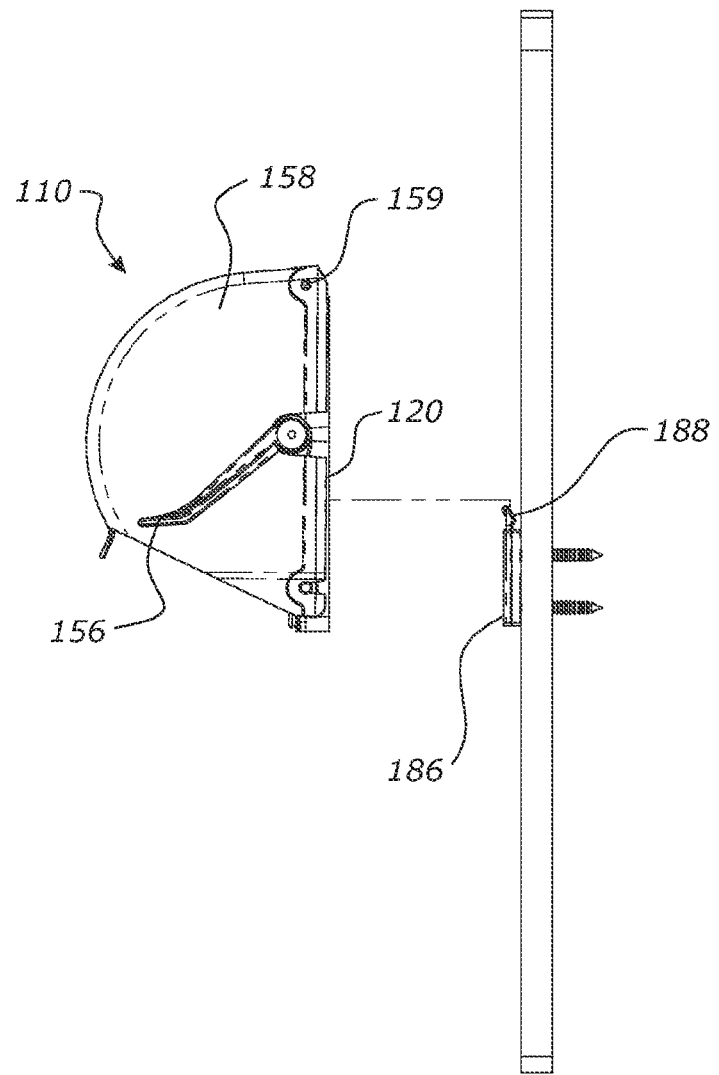
FIG. 19A is a side view showing an alternative mounting of the trap of FIG. 13A to an upright surface such as a wall.
Figure 19B:
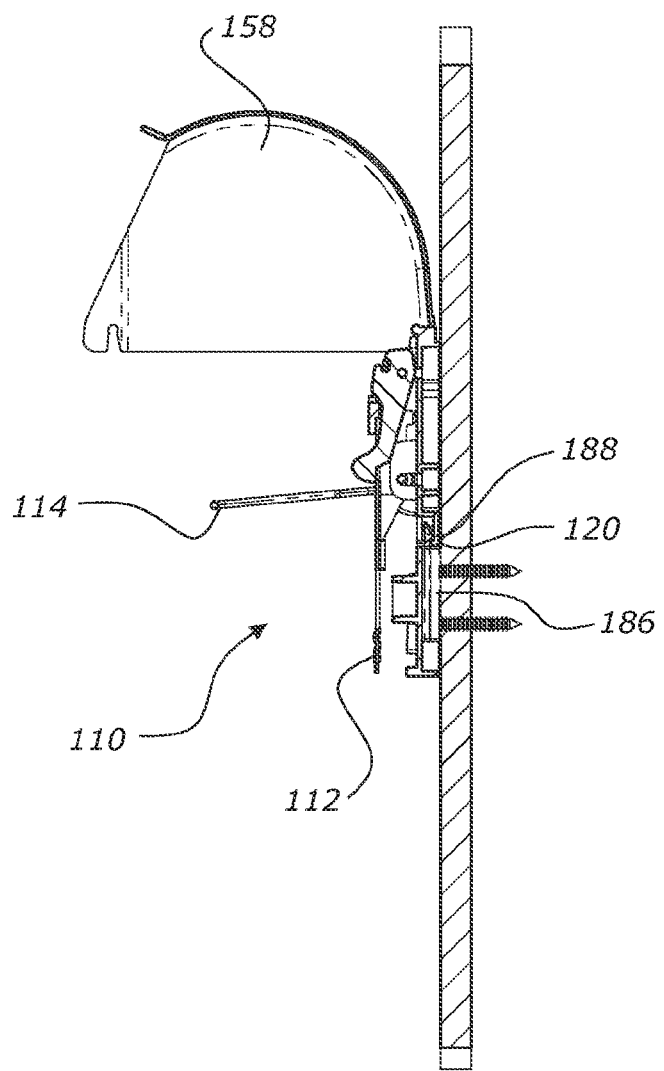
FIG. 19B is a side view of the trap of FIG. 19A mounted to the wall, with the pivoting cover raised.
Figure 19C:
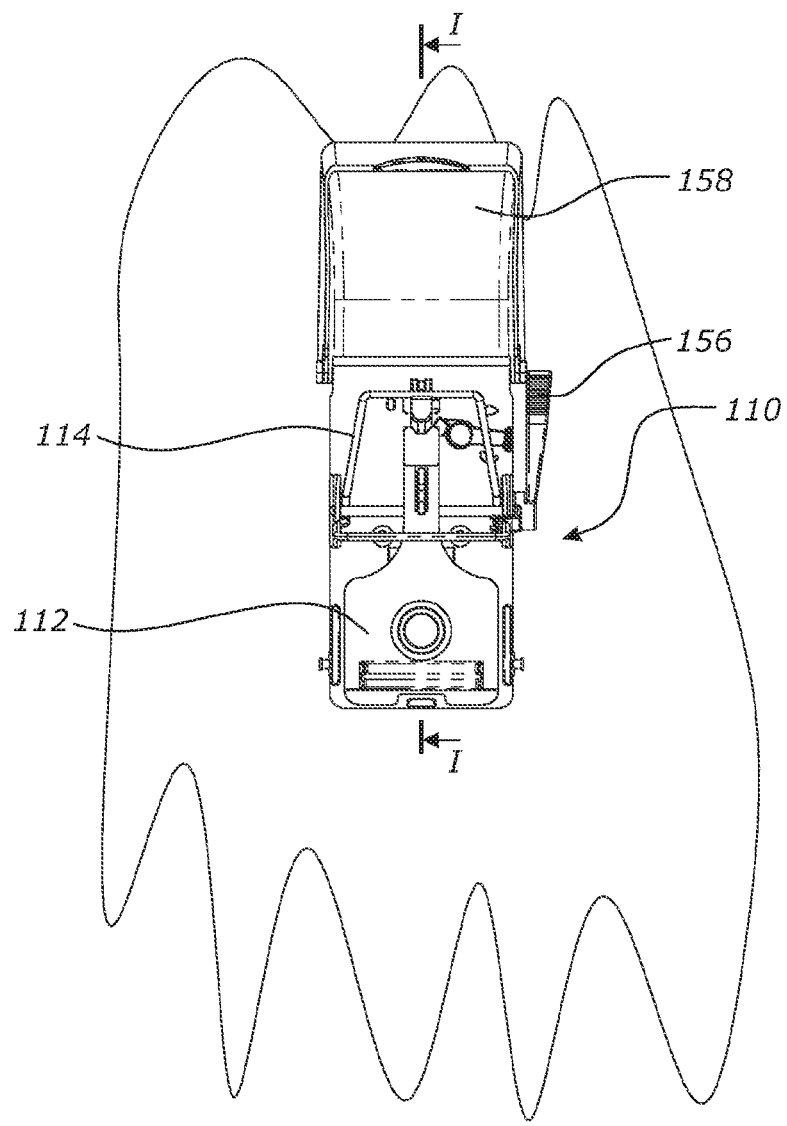
FIG. 19C is a front view corresponding to FIG. 19B.
Figure 19D:
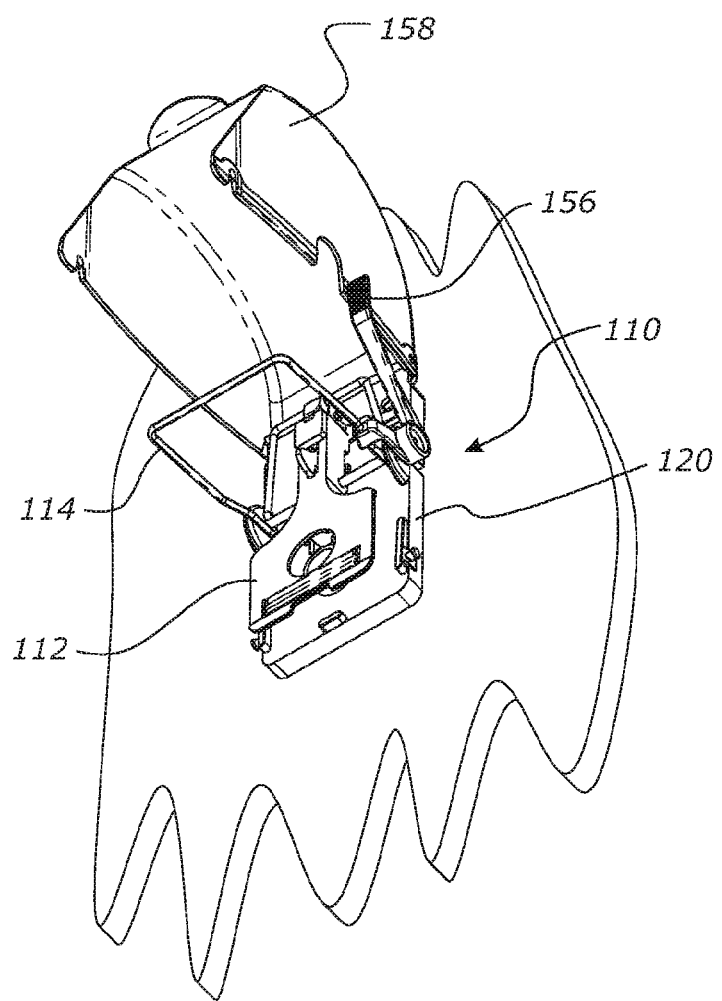
FIG. 19D is an underside perspective view corresponding to FIG. 19B.
Figure 20A:
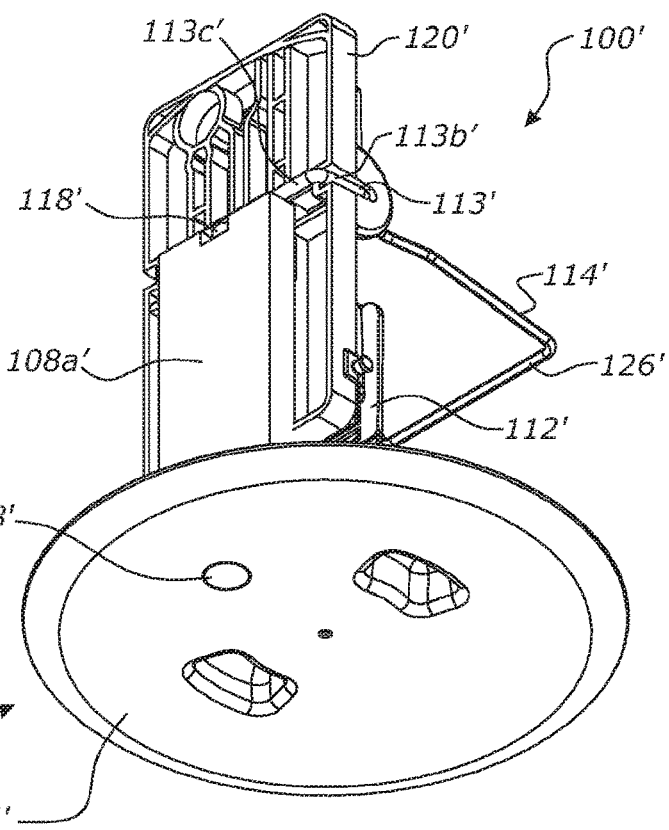
FIG. 20A is a rear underside perspective view of an alternative embodiment animal trap for mounting to the underside of a ceiling panel, with the trap set and the indicator in the recessed position and with the cover not shown.
Figure 20B:
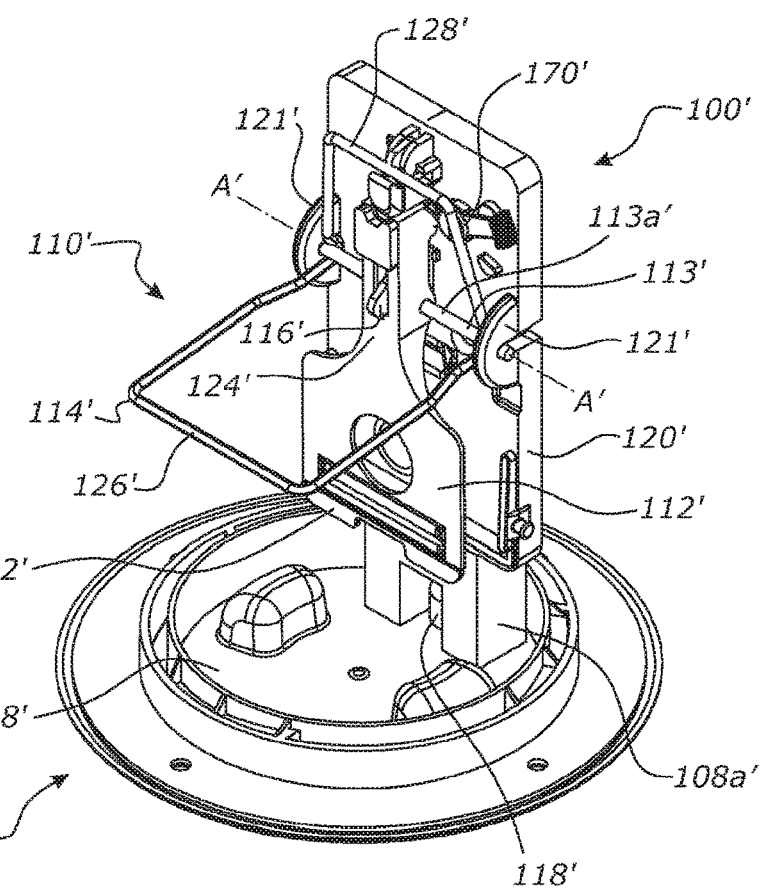
FIG. 20B is a front overhead perspective view of the trap of FIG. 20A.
Figure 20C:
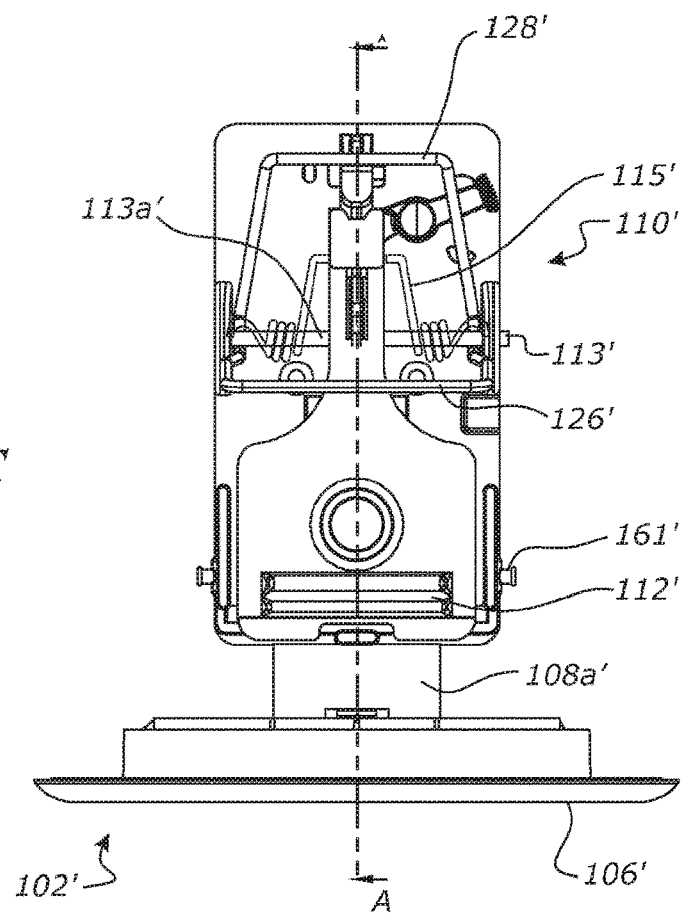
FIG. 20C is a front view of the trap of FIG. 20A.
Figure 20D:
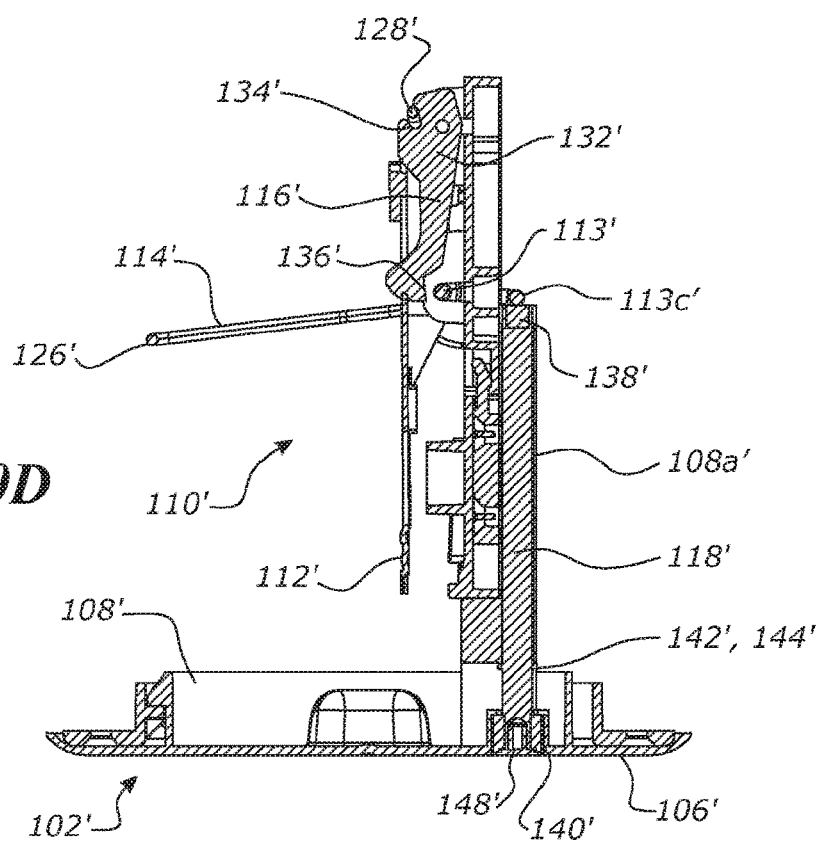
FIG. 20D is a side sectional view along section line A-A of FIG. 20C.
Figure 20E:
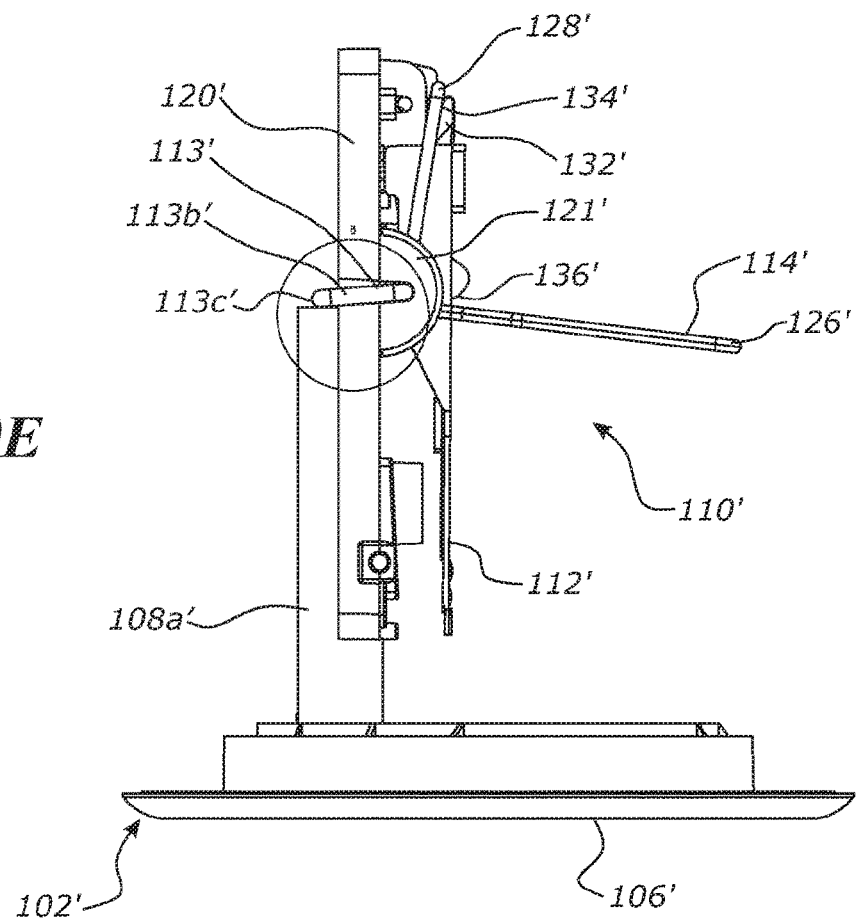
FIG. 20E is an opposite side view of the trap of FIG. 20A.
Figure 20F:
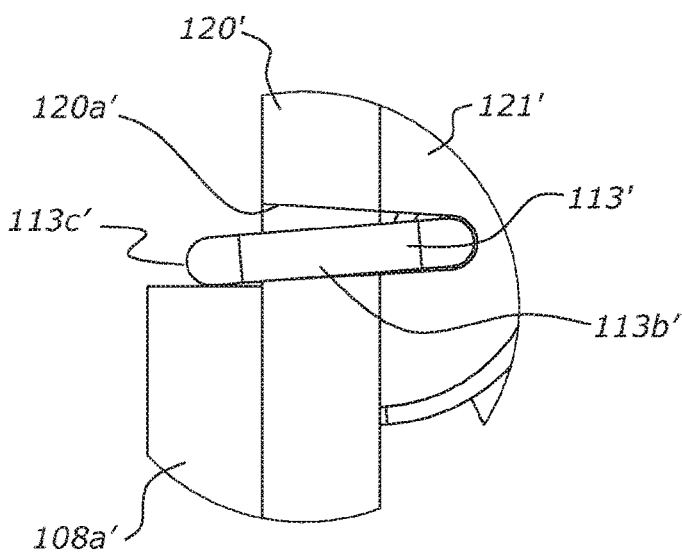
FIG. 20F is an enlarged detail view of region B of FIG. 20E.
Figure 21A:
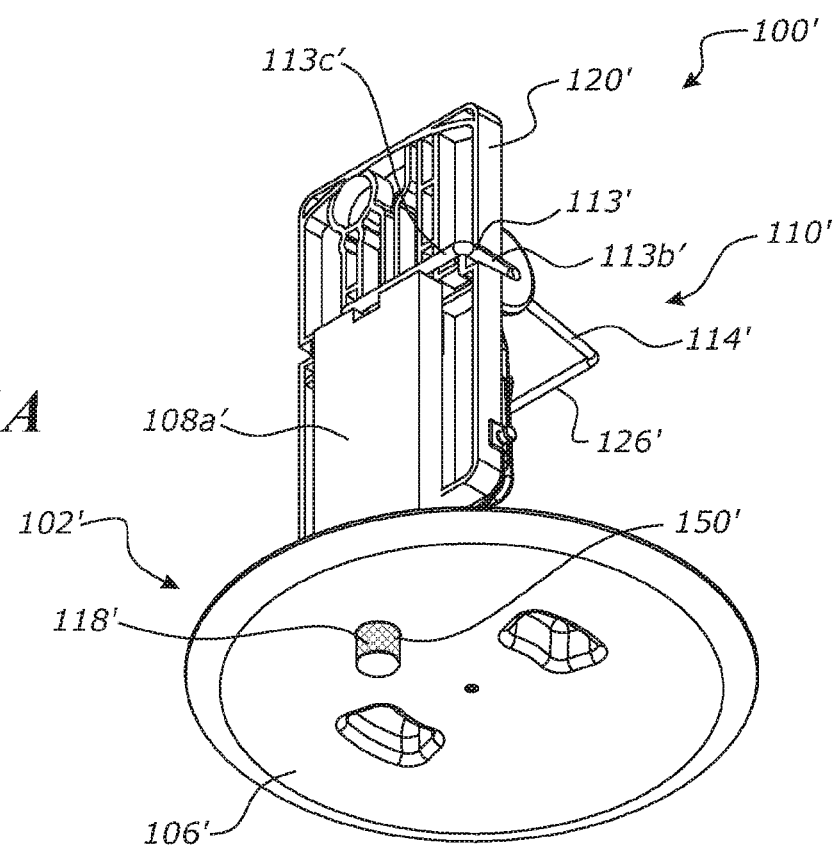
FIG. 21A is a rear underside perspective view of the trap of FIG. 20A, showing the trap triggered and the indicator in the projecting position.
Figure 21B:
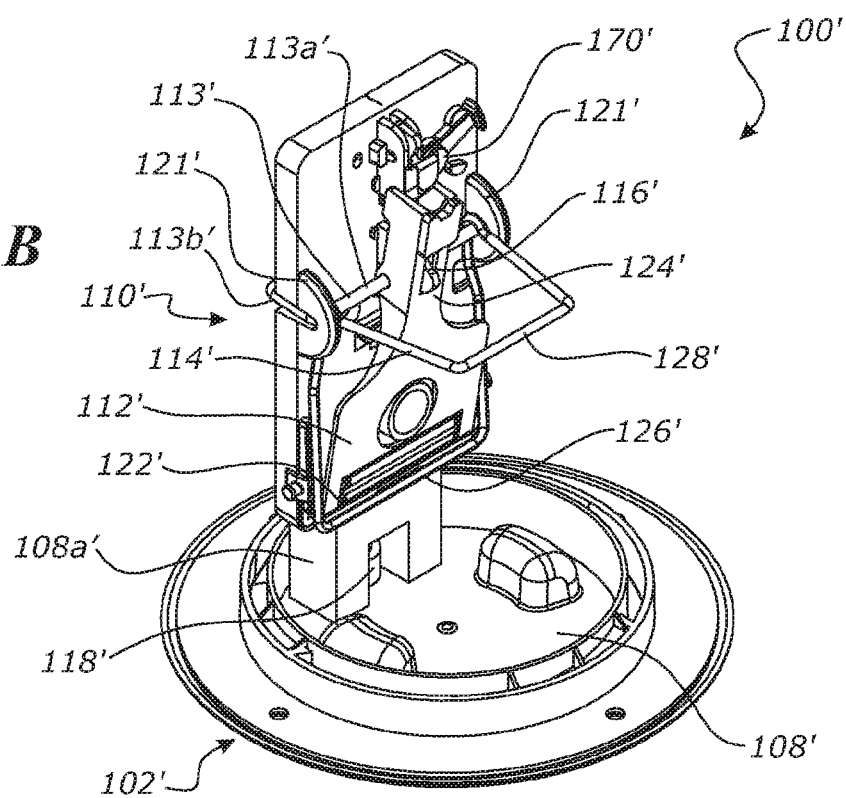
FIG. 21B is a front overhead perspective view of the trap of FIG. 21A.
Figure 21C:
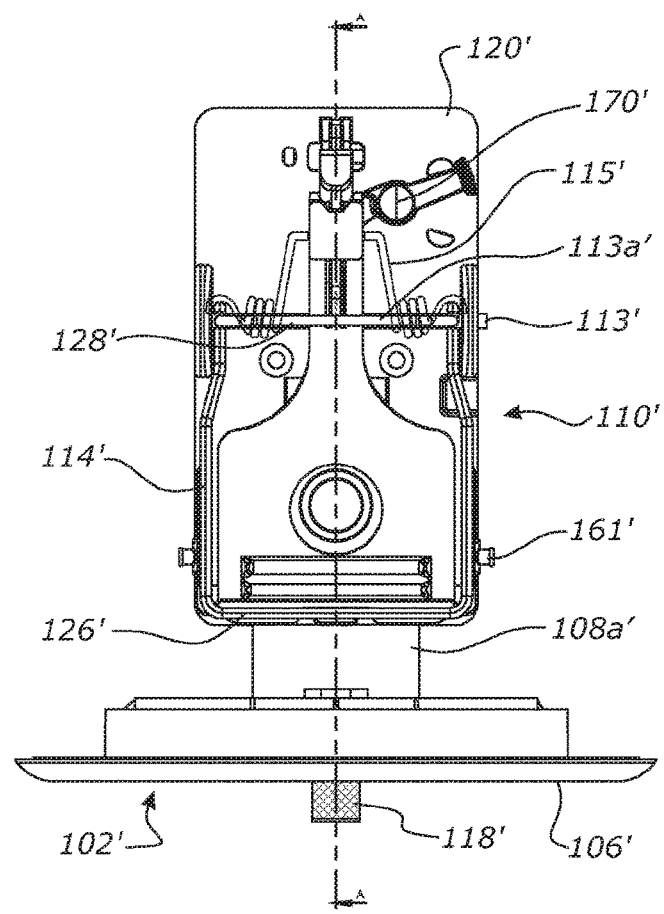
FIG. 21C is a front view of the trap of FIG. 21A.
Figure 21D:
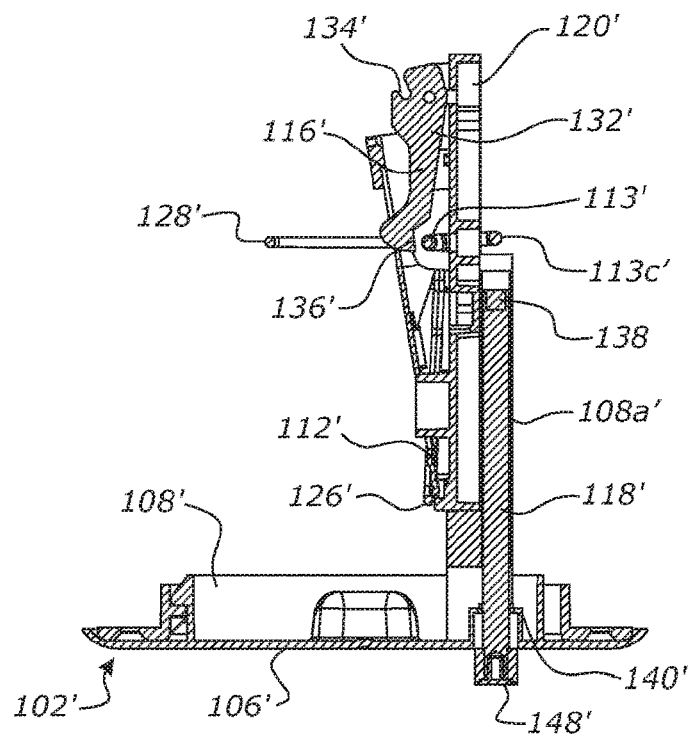
FIG. 21D is a side sectional view along section line A-A of FIG. 21C.
Figure 21E:
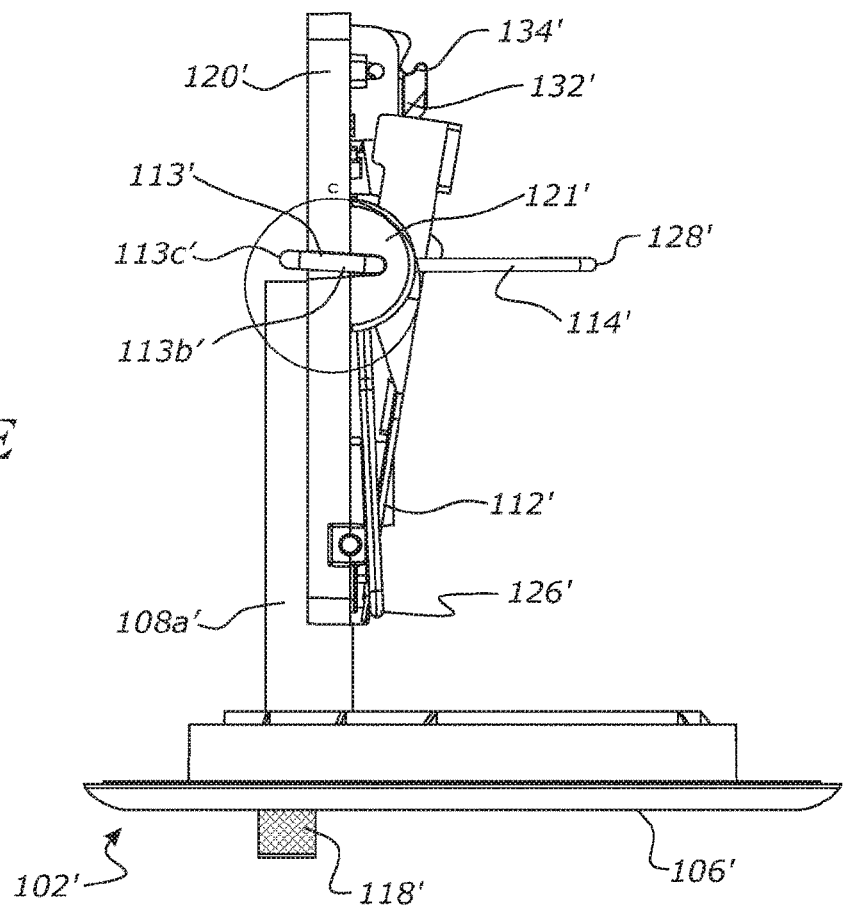
FIG. 21E is an opposite side view of the trap of FIG. 21A.
Figure 21F:
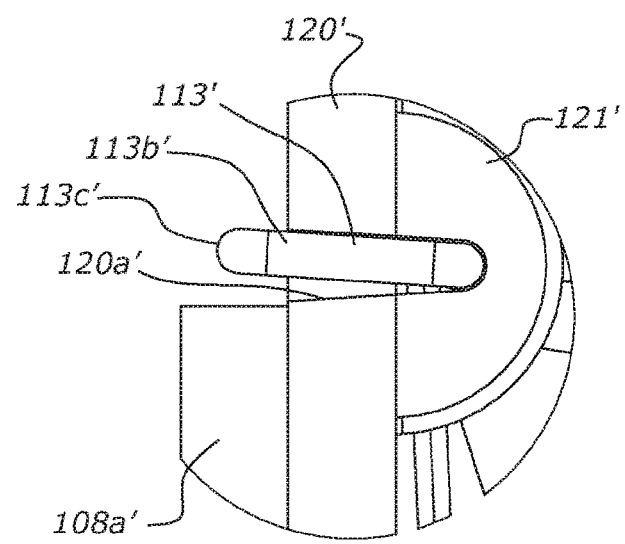
FIG. 21F is an enlarged detail view of region C of FIG. 21E.

Referring to FIGS. 18A-C, the snap trap 110 is shown configured for mounting to an upright surface. Alternatively, the snap trap 110 may be configured for mounting to a surface on any suitable orientation, such as horizontally, vertically, or on an intermediate angle for example. For example, the snap trap 110 may be configured for mounting to a tree, post, wall, floor, ground, ceiling, or any other suitable surface.

Referring to FIGS. 19A-D, in some embodiments the snap trap 110 is provided in combination with a mounting bracket 186 for mounting to the surface, and the snap trap 110 and the mounting bracket 186 comprise complementary engagement portions for engaging the snap trap 110 to the mounting bracket 186. The mounting bracket 186 may be mounted to a surface by fasteners. The mounting bracket 186 may have a resilient tang 188 that engages with a complementary mounting feature in a recess in the base 120 of the snap trap 110, to releasably mount the snap trap 110 to the mounting bracket 186.

The mounting bracket 186 may be configured for mounting the snap trap 110 to a tree, post, wall, floor, ground, ceiling, or any other suitable surface.

In an embodiment, the snap trap 110, 110', 100" is a rodent trap. For example, the snap trap 110, 110', 110" may be used for trapping mice or rats. In an embodiment, in a first, high force, adjustment position the snap trap 110, 110', 110" could be triggered by a rat but not a mouse, and in second, low force, adjustment position the snap trap 110, 110', 110" could be trigged by either a rat or a mouse. Additionally, or alternatively, the snap trap may be used for trapping mustelids such as ferrets, stoats, or weasels. For example, in an embodiment, in the first, high force, adjustment position the snap trap 100, 110', 110" could be triggered by a mustelid such as a ferret, stoat, or weasel.

The features of any of the described embodiments may be used alone or in combination.

Preferred embodiments of the invention have been described by way of example only and modifications may be made thereto without departing from the scope of the invention.

The invention claimed is:

1. A ceiling-mountable animal trap comprising:
    a housing that is arranged to be mounted to an underside of a ceiling, the housing having an underside and an upper side;
    a snap trap in the upper side of the housing, the snap trap comprising:
        a treadle member;
        a killing arm arrangement comprising a killing arm and a pivot member configured such that the killing arm is pivotally mounted relative to the housing and is movable from a set position to an impact position, wherein the killing arm is biased toward the impact position; and
        a trigger that couples the treadle member to the killing arm and that is arranged to release the killing arm from the set position upon the treadle member being moved by an animal in the trap; and
    an indicator that is movable between a recessed position in which it is at least substantially recessed in the housing and a projecting position in which it projects from the underside of the housing, wherein the indicator is configured to be held in the recessed position by the killing arm arrangement when the killing arm is in the set position, and wherein the indicator is configured to decouple from the killing arm arrangement when the killing arm moves from the set position towards the impact position so that the indicator moves to the projecting position.

2. The ceiling-mountable animal trap according to claim 1, wherein the indicator is configured to be held in the recessed position by the killing arm when the killing arm is in the set position, and wherein the indicator is configured to decouple from the killing arm when the killing arm moves from the set position towards the impact position so that the indicator moves to the projecting position.

3. The ceiling-mountable animal trap according to claim 2, wherein the indicator is configured to move to the projecting position solely under the influence of gravity, following decoupling from the killing arm.

4. The ceiling-mountable animal trap according to claim 2, wherein one of the killing arm and the indicator comprises a magnet, and the other of the killing arm and the indicator comprises a magnet or a magnetisable material, the killing arm and indicator configured such that the indicator is held in the recessed position by the killing arm under magnetic force when the killing arm is in the set position.

5. The ceiling-mountable animal trap according to claim 2, wherein the indicator is fully recessed in the housing when the indicator is in the recessed position, and optionally wherein an underside of the indicator is substantially flush with the underside of the housing when the indicator is in the recessed position.

6. The ceiling-mountable animal trap according to claim 1, wherein the indicator is configured to be held in the recessed position by the pivot member when the killing arm is in the set position, and wherein the indicator is configured to decouple from the pivot member when the killing arm moves from the set position towards the impact position so that the indicator moves to the projecting position.

7. The ceiling-mountable animal trap according to claim 6, wherein the snap trap is arranged to be upright when the housing is mounted to the ceiling.

8. The ceiling-mountable animal trap according to claim 7, wherein the housing comprises an upright member to support the snap trap in the upright configuration.

9. The ceiling-mountable animal trap according to claim 6, wherein the indicator is configured to move to the projecting position solely under the influence of gravity, following decoupling from the pivot member.

10. The ceiling-mountable animal trap according to claim 6, wherein one of the pivot member and the indicator comprises a magnet, and the other of the pivot member and the indicator comprises a magnet or a magnetisable material, the pivot member and indicator configured such that the indicator is held in the recessed position by the pivot member under magnetic force when the killing arm is in the set position.

11. The ceiling-mountable animal trap according to claim 6, wherein the indicator is fully recessed in the housing when the indicator is in the recessed position, and optionally wherein an underside of the indicator is substantially flush with the underside of the housing when the indicator is in the recessed position.

12. The ceiling-mountable animal trap according to claim 1, wherein a portion of the periphery of the indicator comprises a different colour and/or pattern compared to an underside of the indicator and the underside of the housing, wherein the portion of the periphery of the indicator is exposed from the housing when the indicator is in the projecting position but not when the indicator is in the recessed position.

13. The ceiling-mountable animal trap according to claim 1, wherein the underside of the housing is arranged to be substantially flush with an underside of the ceiling, when the housing is mounted to the underside of the ceiling.

14. The ceiling-mountable animal trap according to claim 1, wherein the snap trap further comprises a setting lever that is operatively connected to the killing arm, to enable a user to set the snap trap.

15. The ceiling-mountable animal trap according to claim 14, wherein the animal trap comprises a cover, the cover defining an opening that provides an animal accessway adjacent a free end of the treadle member, and wherein the setting lever is positioned externally of the cover.

16. The ceiling-mountable animal trap according to claim 1, wherein the animal trap is a rodent trap.

17. The ceiling-mountable animal trap according to claim 1, wherein the killing arm is movable through an impact zone from the set position to the impact position; and
wherein the snap trap further comprises a sensitivity adjuster to adjust the sensitivity of the snap trap, the sensitivity adjuster comprising an adjuster member that is adjustable by a user externally of the impact zone to adjust an angle of the treadle member relative to the base to thereby adjust the force that is required to move the treadle member to release the killing arm from the set position.

18. The ceiling-mountable animal trap according to claim 17, wherein the sensitivity adjuster has a first, high force, adjustment position in which a relatively large force is required to move the treadle member and a second, low force, adjustment position in which a relatively low force is required to move the treadle member, and wherein the sensitivity adjuster has a third, triggered, adjustment position in which the treadle member is moved by the sensitivity adjuster to a position that triggers the snap trap.

19. The ceiling-mountable animal trap according to claim 17, wherein the sensitivity adjuster has indexed sensitivity adjustment positions.

20. The ceiling-mountable animal trap according to claim 17, wherein the sensitivity adjuster is adjustable by a user when the killing arm is in the set position.

* * * * *